United States Patent
Nagamasa

(10) Patent No.: US 9,020,296 B2
(45) Date of Patent: Apr. 28, 2015

(54) IMAGE CONVERSION APPARATUS, METHOD, AND STORAGE MEDIUM

(71) Applicant: Canon Kabushiki Kaisha, Tokyo (JP)

(72) Inventor: Yoshinobu Nagamasa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 13/773,802

(22) Filed: Feb. 22, 2013

(65) Prior Publication Data

US 2013/0223762 A1    Aug. 29, 2013

(30) Foreign Application Priority Data

Feb. 28, 2012   (JP) .................................. 2012-042387

(51) Int. Cl.
*G06K 9/40* (2006.01)
*G06K 9/32* (2006.01)
*G06T 5/00* (2006.01)

(52) U.S. Cl.
CPC . *G06T 5/00* (2013.01); *G06T 5/006* (2013.01); *G06T 2207/20021* (2013.01); *G06T 2207/30176* (2013.01)

(58) Field of Classification Search
CPC .................. G06T 5/00; G06T 2207/20021
USPC ................................................. 382/276, 293
See application file for complete search history.

(56) References Cited

U.S. PATENT DOCUMENTS

| 6,930,662 | B2 * | 8/2005 | Aoki ............................... 345/87 |
| 7,619,663 | B2 | 11/2009 | Sakurai et al. |
| 8,026,951 | B2 * | 9/2011 | Kondo et al. .............. 348/222.1 |
| 2002/0057345 | A1 * | 5/2002 | Tamaki et al. ................ 348/207 |

FOREIGN PATENT DOCUMENTS

| JP | 3-058285 A | 3/1991 |
| JP | 10-023247 A | 1/1998 |
| JP | 11-312238 A | 11/1999 |
| JP | 2005-267457 A | 9/2005 |
| JP | 2009-211171 A | 9/2009 |

* cited by examiner

*Primary Examiner* — Kanjibhai Patel
(74) *Attorney, Agent, or Firm* — Carter, DeLuca, Farrell & Schmidt, LLP

(57) ABSTRACT

An image conversion apparatus calculates, based on a first value for obtaining first coordinate values in a second image before first conversion, which correspond to coordinate values of one pixel in a first image after first conversion, a second value for obtaining second coordinate values in the second image, which correspond to coordinate values of a pixel adjacent to the one pixel in the first image. The apparatus converts the second coordinate values into third coordinate values for second conversion of converting a third image into the second image and converts the third image into the first image. In the calculation of the second value, addition or subtraction using a constant and a result of the calculation is iteratively executed for sequentially outputting values corresponding to results of multiplication of coordinate values of each pixel in the first image and the constant.

29 Claims, 10 Drawing Sheets

IMAGE CONVERSION APPARATUS, METHOD, AND STORAGE MEDIUM

BACKGROUND OF THE INVENTION

1. Field of the Invention

The present invention relates to an image conversion apparatus and method for converting an image.

2. Description of the Related Art

A white board, a business card, a document, or the like is captured using a digital camera, and the captured image is saved in a recording medium and managed. At this time, if the rectangular object is captured from an oblique direction, a perspective distortion occurs so that the object is distorted to a quadrilateral other than the rectangle in the captured image. In addition, since there is a distortion that is determined at the time of lens design and tends to become large in a wide angle lens or the like, a distortion occurs on the captured image.

U.S. Pat. No. 7,619,663 describes a technique of performing projection transformation for a perspective distortion and distortion correction for a distortion, thereby generating an image free from both distortions from an image containing both distortions. Japanese Patent Laid-Open No. 2009-211171 describes a technique of capturing a face, a fingerprint, or the like using a digital camera and checking the captured image with a check image. Also described is performing projection transformation for a perspective distortion of a captured image and correcting a nonlinear distortion as well.

In projection transformation, a CPU executes, for each pixel, a numeric data process such as multiplication that is relatively time-consuming. If a CPU or a numeric data processor capable of operating at a high speed is incorporated, the scale of the calculation circuits becomes large. To prevent this, Japanese Patent Laid-Open No. 11-312238 describes a technique of speeding up the process without a multiplication process. In the technique described in Japanese Patent Laid-Open No. 11-312238, the x-axis and y-axis of the coordinates of an image are made to correspond to the row address and column address of a memory, respectively. Based on the correspondence between coordinates before conversion and those after conversion, a pixel value read out from an address of coordinates before conversion is stored in an address of the coordinates after conversion. At this time, shift amounts of the row address and column address are obtained concerning the coordinates before and after conversion. The shift amounts are added and subtracted, thereby specifying one read or write address. The technique of Japanese Patent Laid-Open No. 11-312238 executes the above-described process by providing a bus line that transfers data by direct memory access between a transfer source memory and a transfer destination memory before and after projection transformation.

Japanese Patent Laid-Open No. 3-058285 describes a method of performing, without a multiplication process, an image enlargement/reduction process that is a form of projection transformation. In the method described in Japanese Patent Laid-Open No. 3-058285, two kinds of clocks, that is, a reference clock and a thinning clock are provided. The thinning clock is supplied to a memory that handles a smaller image out of the transfer source and transfer destination memories, thereby performing the image enlargement/reduction process. Japanese Patent Laid-Open No. 10-23247 describes an image enlargement/reduction processing method that sequentially adds the increment of a read address determined in accordance with the enlargement/reduction ratio and calculates the read address without a multiplication process.

However, in inverse projection transformation for obtaining the coordinate values of input image data corresponding to the coordinate values of output image data in projection transformation for correcting a perspective distortion, a plurality of multiplication processes need to be executed. If it is necessary to process one image data in a short time as in a moving image process, the plurality of multiplication processes place a heavy load. Hence, hardware in which a plurality of multipliers are arranged in parallel or a high-speed calculation device (for example, CPU) is required.

In the method described in Japanese Patent Laid-Open No. 11-312238, no coordinate values are calculated. Since an interpolation process using a plurality of neighbor pixels cannot be performed, the image quality largely degrades. In addition, distortion correction for a distortion is nonlinear transformation. For this reason, data cannot be transferred by one transfer between the transfer source and transfer destination memories before and after conversion including projection transformation.

In the methods described in Japanese Patent Laid-Open Nos. 3-058285 and 10-23247, the transfer source and transfer destination memories are connected on the row basis so that, for example, data of the fifth row of the transfer source memory is transferred to the third row of the transfer destination memory. For this reason, these methods are applicable only to the image enlargement/reduction process that is one form of projection transformation but not to a projection transformation process using an arbitrary parameter.

Image data captured by a digital camera or the like is generally converted into a format such as JPEG, MPEG, or H.264 by an image coding process and then saved in a storage device or externally output. The image coding process is generally performed on a block basis (for example, 8×8). Hence, when image data after projection transformation is output in the raster scan order, the image data after the projection transformation needs to be converted into the order of the block process before it is input to the device for performing the image coding process. For example, assume that one block has a size of 8×8 pixels. The image coding process of a block on the leftmost column can be executed only after the projection transformation of the first eight pixels of the eighth row is completed. For this reason, a buffer memory having a large capacity is necessary for holding the image after the projection transformation.

SUMMARY OF THE INVENTION

The present invention provides a technique of enabling desired image conversion while reducing the load of a multiplication process.

According to one aspect of the present invention, there is provided an image conversion apparatus comprising: first calculation unit for executing, based on a first value used to obtain first coordinate values in a second image before first image conversion, which correspond to coordinate values of one pixel in first image after the first image conversion, calculation of obtaining a second value used to obtain second coordinate values in the second image before the first image conversion, which correspond to coordinate values of a pixel adjacent to the one pixel in the first image after the first image conversion; second calculation unit for executing calculation of obtaining the second coordinate values using the second value obtained by the calculation of the first calculation unit; coordinate conversion unit for executing coordinate conversion of converting the second coordinate values obtained by the second calculation unit into third coordinate values for second image conversion of converting a third image into the second image; and image conversion unit for executing the first and second image conversion of converting the third image into the first image, based on the third coordinate values converted by the coordinate conversion unit, wherein the first calculation unit iteratively executes one of addition and subtraction using a predetermined constant and an output of the first calculation unit as inputs so as to sequentially output a value corresponding to a multiplication result obtained by multiplying coordinate values of each of a plurality of adjacent pixels in the first image after the first image conversion by the predetermined constant.

According to another aspect of the present invention, there is provided an image conversion apparatus comprising: calculation unit for executing, based on a first value used to obtain coordinate values in a second image before image conversion, which correspond to coordinate values of one pixel in a first image after the image conversion, calculation of obtaining a second value used to obtain coordinate values in the second image before the image conversion, which correspond to coordinate values of a pixel adjacent to the one pixel in the first image after the image conversion; and conversion unit for converting an image to be converted, based on the second value obtained by the calculation unit, wherein the calculation unit iteratively executes, for each of a plurality of blocks obtained by dividing the first image after the image conversion, one of addition and subtraction using a predetermined constant and an output of the calculation unit as inputs so as to sequentially output a value corresponding to a multiplication result obtained by multiplying coordinate values of each of a plurality of adjacent pixels in the first image after the image conversion by the predetermined constant.

According to still another aspect of the present invention, there is provided an image conversion method of an image conversion apparatus, comprising: executing, based on a first value used to obtain first coordinate values in a second image before first image conversion, which correspond to coordinate values of one pixel in a first image after the first image conversion, first calculation of obtaining a second value used to obtain second coordinate values in the second image before the first image conversion, which correspond to coordinate values of a pixel adjacent to the one pixel in the first image after the first image conversion; executing second calculation of obtaining the second coordinate values using the second value obtained by the first calculation; executing coordinate conversion of converting the second coordinate values obtained by the second calculation into third coordinate values for second image conversion of converting a third image into the second image; and executing the first and second image conversion of converting the third image into the first image, based on the third coordinate values converted by the coordinate conversion, wherein in the first calculation, one of addition and subtraction using a predetermined constant and a result of the first calculation as inputs is iteratively executed so as to sequentially output a value corresponding to a multiplication result obtained by multiplying coordinate values of each of a plurality of adjacent pixels in the first image after the first image conversion by the predetermined constant.

According to still yet another aspect of the present invention, there is provided image conversion method of an image conversion apparatus, comprising: executing, based on a first value used to obtain coordinate values in a second image before image conversion, which correspond to coordinate values of one pixel in a first image after the image conversion, calculation of obtaining a second value used to obtain coordinate values in the second image before the image conversion, which correspond to coordinate values of a pixel adjacent to the one pixel in the first image after the image conversion; and converting an image to be converted, based on the second value obtained by the calculation, wherein in the calculation, one of addition and subtraction using a predetermined constant and an output of the calculation as inputs is iteratively executed for each of a plurality of blocks obtained by dividing the first image after the image conversion so as to sequentially output a value corresponding to a multiplication result obtained by multiplying coordinate values of each of a plurality of adjacent pixels in the first image after the image conversion by the predetermined constant.

According to yet still another aspect of the present invention, there is provided a storage medium storing a computer program, the computer program comprising: executing, based on a first value used to obtain first coordinate values in a second image before first image conversion, which correspond to coordinate values of one pixel in a first image after the first image conversion, first calculation of obtaining a second value used to obtain second coordinate values in the second image before the first image conversion, which correspond to coordinate values of a pixel adjacent to the one pixel in the first image after the first image conversion; executing second calculation of obtaining the second coordinate values using the second value obtained by the first calculation; executing coordinate conversion of converting the second coordinate values obtained by the second calculation into third coordinate values for second image conversion of converting a third image into the second image; and executing first and second conversion of converting the image into the first image, based on the third coordinate values converted by the coordinate conversion, wherein in the first calculation, one of addition and subtraction using a predetermined constant and a result of the first calculation as inputs is iteratively executed so as to sequentially output a value corresponding to a multiplication result obtained by multiplying coordinate values of each of a plurality of adjacent pixels in the first image after the first image conversion by the predetermined constant.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(Arrangement of Image Processing Apparatus)

Figure 1:
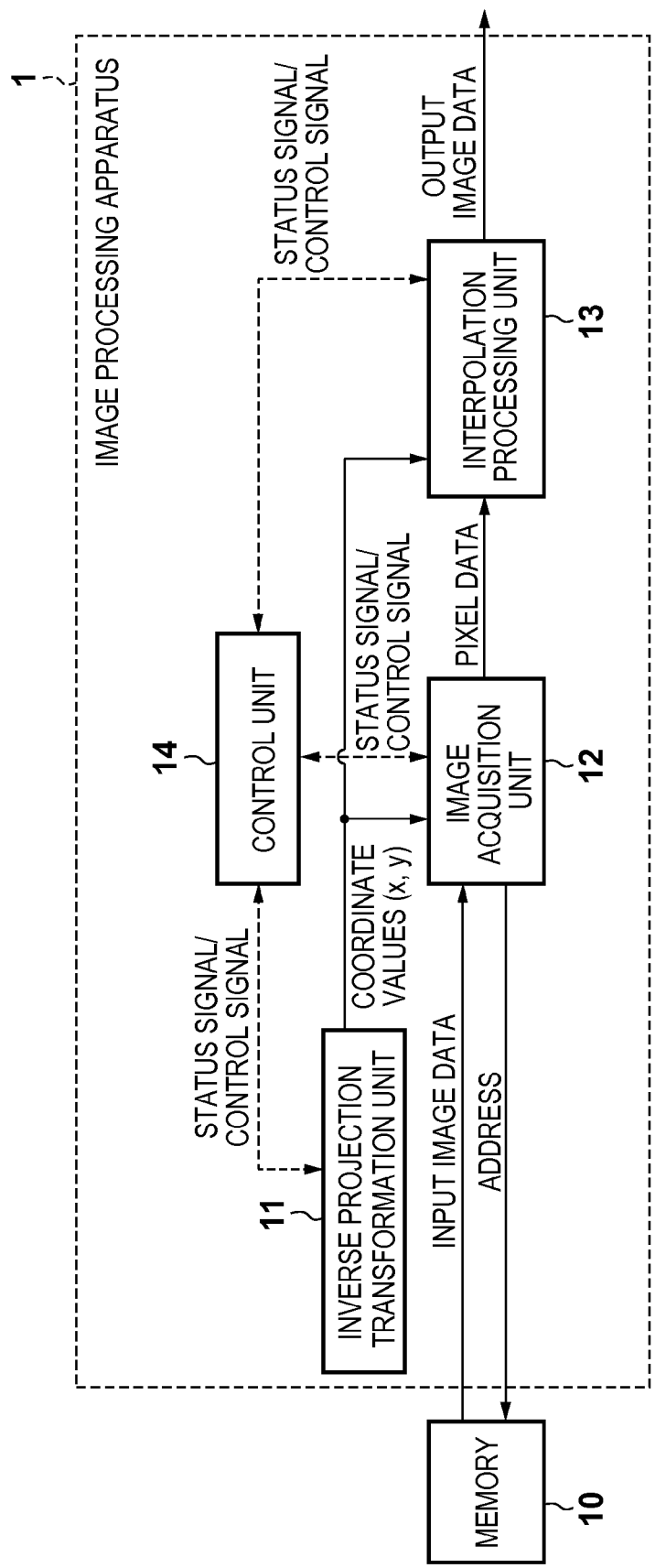
FIG. 1 is a block diagram showing an example of the arrangement of an image processing apparatus.
Figure 2:
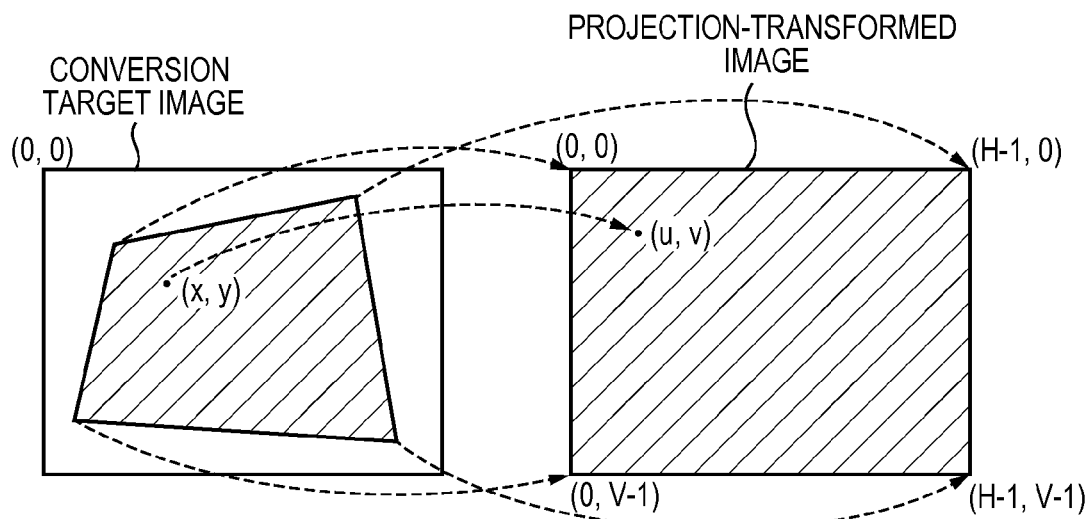
FIG. 2 is a view showing an example of image conversion in the image processing apparatus.

FIG. 1 is a block diagram showing the arrangement of an image processing apparatus. FIG. 2 shows an example of image conversion in the image processing apparatus. An image processing apparatus 1 converts an image using a transformation matrix that is a regular matrix such that the four vertices of an arbitrary quadrilateral portion (the hatched portion in FIG. 2) on a conversion target image that is an image before conversion matches the four vertices of a rectangle. The image processing apparatus 1 includes an inverse projection transformation unit 11, an image acquisition unit 12, an interpolation processing unit 13, and a control unit 14. A description will be made below assuming that conversion using a transformation matrix is projection transformation as an example thereof, and an image after conversion obtained by applying projection transformation to a conversion target image before conversion is a projection-transformed image.

The position of each pixel of the conversion target image that is the image before conversion is represented by first coordinate values (x, y), and the position of each pixel of the projection-transformed image after conversion generated by the image processing apparatus 1 is represented by second coordinate values (u, v). The projection-transformed image is assumed to be an image including H pixels in the horizontal direction and V pixels in the vertical direction. Note that each of x and u is a coordinate element representing the horizontal component of coordinate values, and each of y and v is a coordinate element representing the vertical component of coordinate values.

The inverse projection transformation unit 11 outputs the first coordinate values (x, y) representing the position of a pixel on the conversion target image, which is necessary for generating a pixel on the second coordinate values (u, v) of the projection-transformed image. The basic operation of the inverse projection transformation unit 11 will briefly be described below. The relationship between the second coordinate values (u, v) of the projection-transformed image and the first coordinate values (x, y) of the corresponding conversion target image is represented by $$\begin{bmatrix} a & b & c \\ d & e & f \\ g & h & 1 \end{bmatrix} \begin{bmatrix} u \\ v \\ 1 \end{bmatrix} \sim \begin{bmatrix} x \\ y \\ 1 \end{bmatrix} \quad (1)$$

An equivalence relation holds between the vector representing coordinates on the right-hand side and the product of the matrix and the vector representing coordinates on the left-hand side. Elements a to h are the matrix elements of the inverse matrix of the transformation matrix of projection transformation. The projection transformation result changes depending on the combination of the values. That is, the first coordinate values (x, y) and the second coordinate values (u, v) are associated by the matrix elements of the inverse matrix. The first coordinate values (x, y) are represented, using the second coordinate values (u, v), by $$x = \frac{a \times u + b \times v + c}{g \times u + h \times v + 1} \quad (2)$$

$$y = \frac{d \times u + e \times v + f}{g \times u + h \times v + 1}$$

Equations (2) are obtained from equation (1).

Using equations (2) makes it possible to specify the first coordinate values (x, y) from the second coordinate values (u, v). Note that the first coordinate values (x, y) need not always be integers, that is, may be values including a fractional part at this point of time, as is apparent from equations (2).

Figure 3:
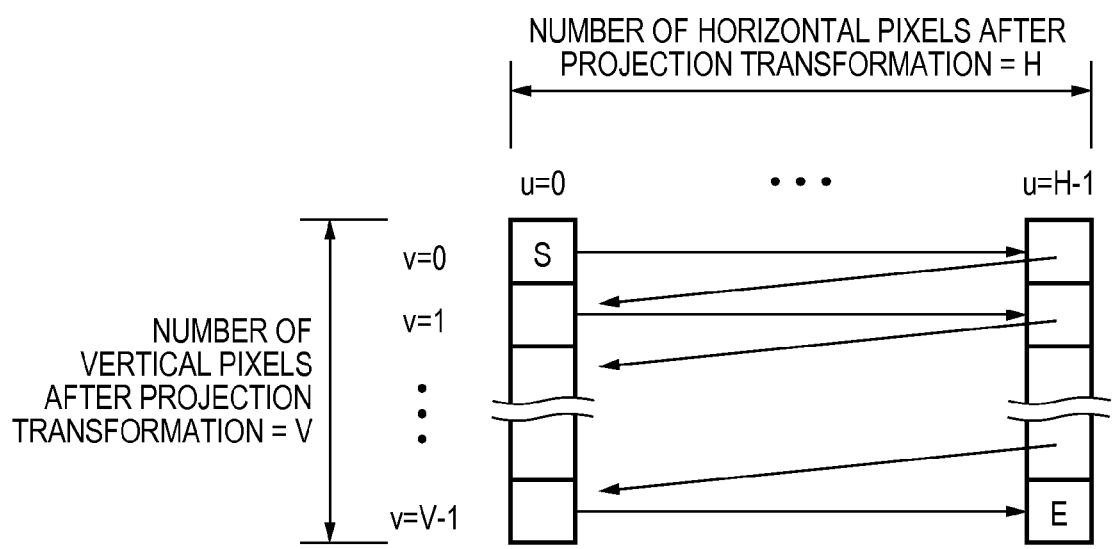
FIG. 3 is a view showing the process order of coordinate values (u, v)

The inverse projection transformation unit 11 substitutes the second coordinate values (u, v) into equations (2) in the raster scan order and sequentially calculates the first coordinate values (x, y) that are output values, as shown in FIG. 3. FIG. 3 shows the substitution order of the coordinate values (u, v) into equations (2) by plotting u along the abscissa and v along the ordinate. Note that the minimum value of the coordinate element u is 0, and the maximum value is H−1, whereas the minimum value of the coordinate element v is 0, and the maximum value is V−1 based on the number of pixels after projection transformation. At this time, the inverse projection transformation unit 11 starts calculating the output values from calculation of the coordinate values (x, y) corresponding to coordinate values S=(u, v)=(0, 0). The inverse projection transformation unit 11 subsequently calculates the coordinate values (x, y) corresponding to the coordinate values of one horizontal line up to the coordinate values (u, v)=(H−1, 0) in the horizontal direction while incrementing the coordinate element u by one. Then, the inverse projection transformation unit 11 returns the coordinate element u to the minimum value "0" and increments the coordinate element v by one. The inverse projection transformation unit 11 then sequentially calculates the coordinate values (x, y) corresponding to the next one line from the coordinate values (u, v)=(0, 1) to the coordinate values (u, v)=(H−1, 1). This calculation is iterated until the coordinate values (x, y) corresponding to coordinate values E=(u, v)=(H−1, V−1) are calculated. The inverse projection transformation unit 11 outputs the coordinate values (x, y) corresponding to all the coordinate values (u, v). Details of the inverse projection transformation unit 11 will be described later.

Based on the first coordinate values (x, y) calculated by the inverse projection transformation unit 11, the image acquisition unit 12 issues an address to a memory 10 that saves the conversion target image, and acquires image data by reading it out. The image acquisition unit 12 also outputs pixel data necessary for an interpolation process from the acquired image data. The interpolation processing unit 13 performs a bilinear interpolation process for the coordinate values (x, y) each of which is not an integer using its fractional part and the pixel data input from the image acquisition unit 12, thereby generating output image data and outputting it. The control unit 14 receives status signals representing the states of the inverse projection transformation unit 11, the image acquisition unit 12, and the interpolation processing unit 13 and generates a control signal to control each functional unit.

(Operation of Image Processing Apparatus)

The operation of each functional unit of the image processing apparatus 1 will be explained. First, the inverse projection transformation unit 11 sequentially outputs the first coordinate values (x, y) on the conversion target image before conversion, which correspond to the second coordinate values (u, v) on the projection-transformed image after conversion, under the control of the control unit 14. Next, the image acquisition unit 12 reads out input image data from an address on the memory 10 where a pixel value to be used by the interpolation processing unit 13 is saved, and outputs the pixel value to the interpolation processing unit 13. To perform the bilinear interpolation process, the image acquisition unit 12 outputs the pixel data of four pixels around the coordinate values (x, y) to the interpolation processing unit 13. For example, when (x, y)=(3.1, 4.5), the image acquisition unit 12 acquires the pixel values of coordinates (3, 4), (4, 4), (3, 5), and (4, 5) and outputs them to the interpolation processing unit 13. The interpolation processing unit 13 performs the bilinear interpolation process using the pixel data and the fractional parts of the coordinate values (x, y), and outputs a pixel value, that is, output image data for the projection-transformed image.

(Arrangement of Inverse Projection Transformation Unit)

Figure 4:
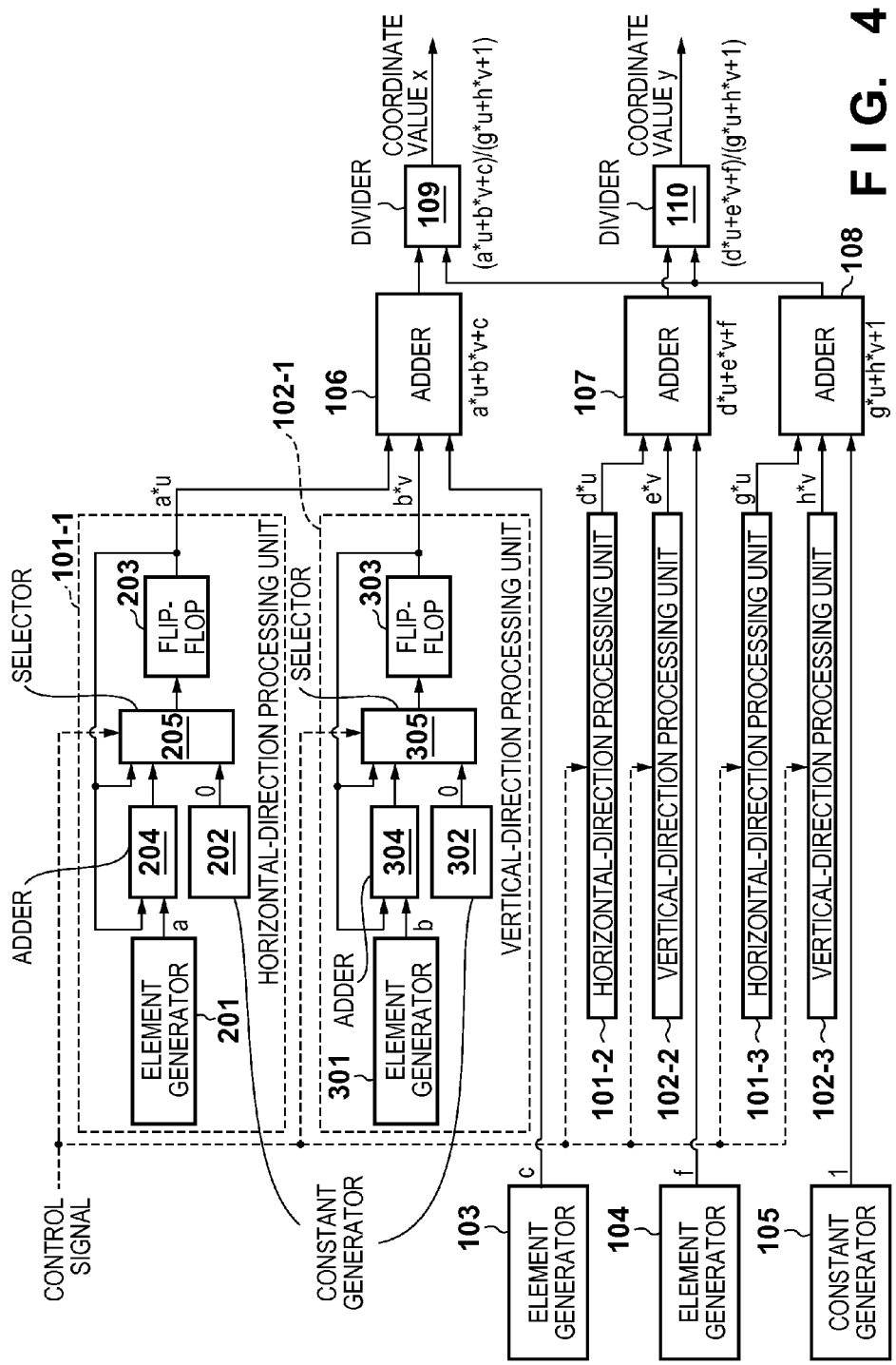
FIG. 4 is a block diagram showing an example of the internal arrangement of an inverse projection transformation unit.

FIG. 4 is a block diagram showing an example of the internal arrangement of the inverse projection transformation unit 11. The inverse projection transformation unit 11 includes three horizontal-direction processing units 101-1 to 101-3 and three vertical-direction processing units 102-1 to 102-3. The inverse projection transformation unit 11 also includes element generators 103 and 104, a constant generator 105, adders 106 to 108, and dividers 109 and 110.

Each of the horizontal-direction processing units 101-1 to 101-3 includes, for example, an element generator 201, a constant generator 202, a flip-flop 203, an adder 204, and a selector 205. The first horizontal-direction processing unit 101-1 outputs the value of a multiplicative expression a×u that multiplies the matrix element a of the inverse matrix by the horizontal-direction coordinate element u concerning the projection-transformed image after conversion. Similarly, the second horizontal-direction processing unit 101-2 outputs the value of a multiplicative expression d×u, and the third horizontal-direction processing unit 101-3 outputs the value of a multiplicative expression g×u.

Each of the vertical-direction processing units 102-1 to 102-3 includes, for example, an element generator 301, a constant generator 302, a flip-flop 303, an adder 304, and a selector 305. The first vertical-direction processing unit 102-1 outputs the value of a multiplicative expression b×v that multiplies the matrix element b of the inverse matrix by the vertical-direction coordinate element v concerning the projection-transformed image after conversion. Similarly, the second vertical-direction processing unit 102-2 outputs the value of a multiplicative expression e×v, and the third vertical-direction processing unit 102-3 outputs the value of a multiplicative expression h×v.

The element generator 201 of the first horizontal-direction processing unit 101-1, the element generator 301 of the first vertical-direction processing unit 102-1, and the element generator 103 output a, b, and c that are the matrix elements of the first row of the inverse matrix, respectively. The element generator 201 of the second horizontal-direction processing unit 101-2, the element generator 301 of the second vertical-direction processing unit 102-2, and the element generator 104 output d, e, and f that are the matrix elements of the second row of the inverse matrix, respectively. The element generator 201 of the third horizontal-direction processing unit 101-3, the element generator 301 of the third vertical-direction processing unit 102-3, and the constant generator 105 output g, and h and a constant "1" that are the matrix elements of the third row of the inverse matrix, respectively. The values of the elements a to h do not change while coordinate values are being calculated to perform one projection transformation for one image. During any other period, the values may be changed to obtain a different projection transformation result.

The constant generators 202 and 302 output a fixed value "0". Note that the fixed value corresponds to the minimum value of the horizontal component u and the vertical component v of the coordinate values of the projection-transformed image after conversion. However, to obtain coordinate values within a partial range of the projection-transformed image, the minimum values of the horizontal component and the vertical component in the partial range may be set as the initial coordinates, and values obtained by multiplying the coordinate elements by the matrix elements may be used as the fixed values. Additionally, for example, to obtain coordinates after conversion within a predetermined range, multiplication results of the matrix elements of the inverse matrix and the coordinate elements of the leftmost and rightmost coordinates of a minimum region including the predetermined range may be set as the initial values and held in the constant generators 202 and 302. Note that when u=0, for example, a×u=0. Hence, the output of the first horizontal-direction processing unit 101-1 is also 0. For this reason, the constant generator 202 holds 0 as the initial value. This also applies to the remaining horizontal-direction processing units 101-2 and 101-3 and the vertical-direction processing units 102-1 to 102-3.

The flip-flop 203 delays the input by one cycle based on an operation clock supplied from a clock source (not shown) and outputs the value of (output value of element generator 201)× u. Similarly, the flip-flop 303 delays the input by one cycle based on an operation clock supplied from a clock source (not shown) and outputs the value of (output value of element generator 301)×v. The adder 204 adds the output value of the flip-flop 203 and the output value of the element generator 201 and outputs the added result. The adder 304 adds the output value of the flip-flop 303 and the output value of the element generator 301 and outputs the added result.

The matrix elements output from the element generators 103, 104, 201, and 301 are expressed as fixed-point numbers. The fractional part of each matrix element has bits as many as required by the image processing apparatus 1. Except the fixed value "0", each of the constant generators 105, 202, and 302 outputs a value expressed as a fixed-point number that have bits as many as those of the fractional part from the element generators 103, 104, 201, and 301. The necessary number of bits of the fractional part changes depending on the apparatus to be applied.

The selectors 205 and 305 select values to be output to the flip-flops 203 and 303, respectively, based on a signal from the control unit 14. Note that the selector 205 of each of the horizontal-direction processing units 101-1 to 101-3 receives the output value of the flip-flop 203 at the immediately preceding clock, a value obtained by adding the value from the element generator 201 to the output value, and the output value of the constant generator 202. Similarly, the selector 305 of each of the vertical-direction processing units 102-1 to 102-3 receives the output value of the flip-flop; 303 corresponding to the immediately preceding clock, a value obtained by adding the value from the element generator 301 to the output value, and the output value of the constant generator 302.

The adder 106 adds the output values of the flip-flop 203 of the horizontal-direction processing unit 101-1, the flip-flop 303 of the vertical-direction processing unit 102-1, and the element generator 103 and outputs the added result. The output value of the adder 106 corresponds to the numerator of the equation for obtaining x of equations (2). The adder 107 adds the output values of the flip-flop 203 of the horizontal-direction processing unit 101-2, the flip-flop 303 of the vertical-direction processing unit 102-2, and the element generator 104 and outputs the added result. The output value of the adder 107 corresponds to the numerator of the equation for obtaining y of equations (2). The adder 108 adds the output values of the flip-flop 203 of the horizontal-direction processing unit 101-3, the flip-flop 303 of the vertical-direction processing unit 102-3, and the constant generator 105 and outputs the added result. The output value of the adder 108 corresponds to the denominator of both the equations for obtaining x and y of equations (2).

The divider 109 performs division using the output value of the adder 106 as the numerator and the output value of the adder 108 as the denominator, and specifies and outputs x of equations (2). The divider 110 performs division using the output value of the adder 107 as the numerator and the output value of the adder 108 as the denominator, and specifies and outputs y of equations (2).

The output of each of the dividers 109 and 110 is a value expressed as a fixed-point number having the necessary number of bits of the fractional part. More specifically, when division is performed using, as the numerator, a value including the output of the adder 106 or 107 as the upper bits and "0" equal in number to the bits of the fractional part as the lower bits, and the output value of the adder 108 as the denominator, a value expressed as a fixed-point number having the necessary number bits of the fractional part can be obtained. The necessary number of bits of the fractional part is not always equal to the number of bits of the element generators 103, 104, 201, and 301 and changes depending on the apparatus to be applied. The dividers may be configured to obtain a floating-point number as the output.

(Operation of Inverse Projection Transformation Unit)

Each of the horizontal-direction processing units 101-1 to 101-3 calculates the multiplication result of the matrix element of the inverse matrix and the coordinate element of coordinates adjacent to the right side of given coordinates P by adding the matrix element to the multiplication result of the matrix element and the coordinate element of the coordinates P. That is, in accordance with one increment of the coordinate element u, the matrix element is added to the multiplication result before the increment, and the product of the coordinate element and the matrix element is calculated. Similarly, each of the vertical-direction processing units 102-1 to 102-3 calculates the multiplication result of the matrix element of the inverse matrix and the coordinate element of coordinates adjacent to the lower side of given coordinates Q by adding the matrix element to the multiplication result of the matrix element and the coordinate element of the coordinates Q. In addition, when the multiplication result of a predetermined coordinate element and the matrix element of the inverse matrix is given as the initial value, the multiplication result of the coordinate element and the matrix element can be obtained by an addition process sequentially from the coordinates adjacent to the predetermined coordinate element.

For example, when a predetermined coordinate element in the horizontal direction is u=0, 0 is initially output as the result of multiplication of the matrix element $\underline{a}$ and the coordinate element u, that is, a×u. The coordinates adjacent on the right side are obtained by incrementing u by one from the predetermined coordinate element. Hence, $\underline{a}$ obtained by adding the matrix element $\underline{a}$ to the preceding calculation result "0" is output as the multiplication result of a×u. When u is further incremented by one, 2a obtained by adding the matrix element "a" to the multiplication result "a" of the preceding calculation is output as the result of a×u. Thus adding the matrix element using the multiplication result previously obtained for the adjacent coordinates enables to replace the multiplication process with the addition process. This allows to reduce the calculation amount and decrease the number of calculation circuits. The detailed operation of each unit of the inverse projection transformation unit 11 will be described below with reference to FIG. 5.

Figure 5:
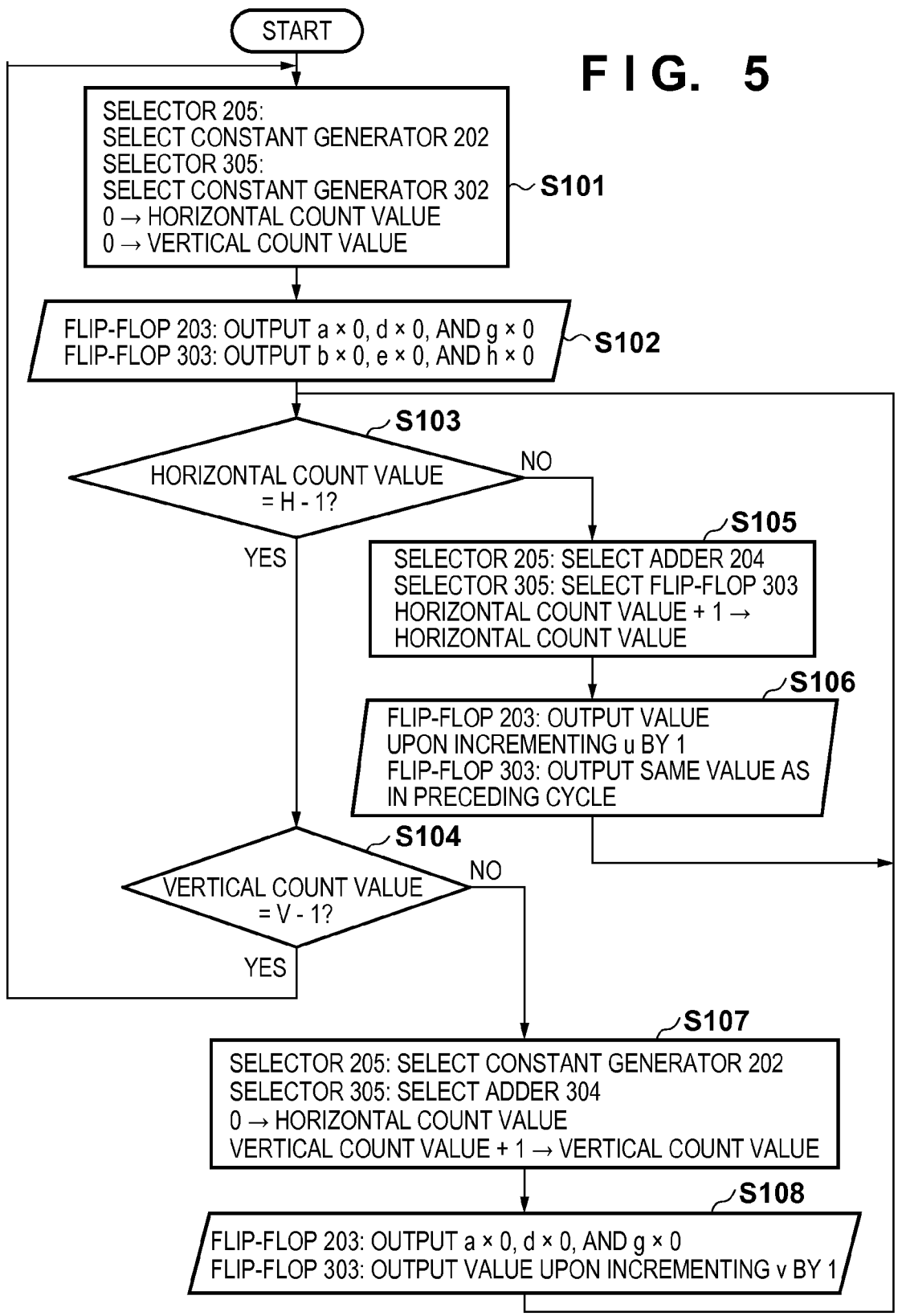
FIG. 5 is a flowchart showing the control operation of the inverse projection transformation unit.

FIG. 5 is a flowchart showing the control operation in the horizontal-direction processing units and the vertical-direction processing units of the inverse projection transformation unit 11. In the inverse projection transformation unit 11, the selectors 205 and 305 are controlled by the horizontal count value and the vertical count value from the control unit 14. The horizontal count value whose initial value is "0" is incremented by one every time the selector 205 selects the adder 204, and initialized to 0 again after having reached H−1. The vertical count value whose initial value is "0" is incremented by one every time the selector 305 selects the adder 304, and initialized to 0 again after having reached V−1.

The selector 205 of each of the horizontal-direction processing units 101-1 to 101-3 operates such that the corresponding flip-flop 203 outputs the value of a corresponding one of the multiplicative expressions a×u, d×u, and g×u in the raster scan order. The selector 305 of each of the vertical-direction processing units 102-1 to 102-3 operates such that the corresponding flip-flop 303 outputs the value of a corresponding one of the multiplicative expressions b×v, e×v, and h×v in the raster scan order. The first horizontal-direction processing unit 101-1 and the first vertical-direction processing unit 102-1 will mainly be explained below in detail. The remaining horizontal-direction processing units 101-2 and 101-3 and vertical-direction processing units 102-2 and 102-3 also operate in a similar manner.

At the start of the process, the selector 205 selects the output of the constant generator 202 and inputs the constant, that is, "0" to the flip-flop 203 (step S101). The output value of the constant generator 202 in each of the horizontal-direction processing units 101-1 to 101-3 equals the values a×u, d×u, and g×u when u=0, that is, the output value is 0. At the same time, the selector 305 selects the output of the constant generator 302 and inputs the constant, that is, "0" to the flip-flop 303. The output value of the constant generator 302 in each of the vertical-direction processing units 102-1 to 102-3 equals the values b×v, e×v, and h×v when v=0, that is, the output value is 0. Note that the horizontal count value and the vertical count value are initialized to 0. The flip-flops 203 and 303 output the values "0", which are the output values of the constant generators 202 and 302 (step S102).

Note that the value output by the flip-flops 203 and 303 in step S102 is actually executed in the cycle next to the process in step S101. In addition, the output in step S102 is executed in the same cycle as that of the processes in steps S103 and S105. That is, although step S103 is executed after step S102 in FIG. 5 for the sake of descriptive simplicity, these processes are actually executed in the same cycle. In the same cycle as that of the output in step S102, the selectors 205 and 305 select the values to be output from the flip-flops 203 and 303 in the next cycle.

t is determined whether the horizontal count value is "H−1" (step S103). That is, it is determined whether value input to the flip-flop 203 has been done as many times as the number of horizontal pixels after projection transformation. If the horizontal count value is not H−1 (NO in step S103), the selector 205 selects the output of the adder 204 in the next cycle (step S105).

The adder 204 outputs a value obtained by adding the output of the element generator 201 to the output of the flip-flop 203 at the current clock. That is, if 0 is output from the flip-flop 203 at the current point of time, the adder 204 outputs "a" that is a value obtained by adding the output a of the element generator 201 to the value (0). Similarly, if a×u=a×N is output from the flip-flop 203 at the current point of time, the adder 204 outputs a×N+a=a×(N+1) by adding a to the value. In this way, the adder 204 of the horizontal-direction processing unit 101-1 outputs the value when u is incremented by one in the multiplicative expression a×u. Hence, the selector 205 outputs a×(u+1), which is the output of the adder 204, to the flip-flop 203 (step S105), and the flip-flop 203 outputs the value (step S106). On the other hand, the selector 305 of the vertical-direction processing unit 302-1 selects the output of the flip-flop 303 (step S105) to form a feedback loop. The flip-flop 303 outputs the previously output value again (step S106). The horizontal count value is incremented by one (step S105). The processes in steps S105 and S106 are iterated hereafter until the value input to the flip-flop has been done as many times as the number of horizontal pixels after projection transformation, and the horizontal count value reaches H−1 (YES in step S103).

In the above description, for the sake of facilitating the understanding, the values output from the selectors 205 and 305 in step S105 are output from the flip-flops 203 and 303 in step S106, and the determination in step S103 is then performed. Actually, the output in step S106 is performed in the next cycle. More specifically, the values output from the selectors 205 and 305 in step S105 are output from the flip-flops 203 and 303 in the next cycle. Parallel to the output, the determination in step S103 and the output in step S105 are performed, and the operation of outputting, to the flip-flops 203 and 303, the values to be output from the flip-flops 203 and 303 in the next cycle is also performed. If YES in step S103, the process in step S104 or S107 is performed in the same cycle as that of the process in step S106.

When the horizontal count value is H−1 (YES in step S103), the values of a×u and b×v corresponding to one row of the projection-transformed image are input to the flip-flops 203 and 303. Next, it is determined whether the vertical count value is V−1 (step S104). In this case, it is determined whether the row processed in steps S103 and S105 is the lowermost row of the projection-transformed image, that is, corresponding values of a×u and b×v are input to the flip-flops 203 and 303 for all the pixels.

If the vertical count value is not V−1 (NO in step S104), the selector 205 of each of the horizontal-direction processing units 101-1 to 101-3 selects the output of the constant generator 202 again and inputs a corresponding one of the values of a×0, d×0, and g×0 when u=0, that is, "0" to the flip-flop 203 (step S107). At the same time, the selector 305 of each of the vertical-direction processing units 102-1 to 102-3 selects the output of the adder 304 and inputs the value when v of the multiplicative expressions b×v, e×v, and h×v to be used in the process of the next line is incremented by one to the flip-flop 303. The adder 304 operates like the adder 204. If b×v=b×M at the current clock, the adder 304 outputs b × M+b=b×(M+1) that is obtained by adding the output b of the element generator 301 to the value. That is, the adder 304 outputs the value when v is incremented by one in the multiplicative expression b×v. Hence, the selector 305 outputs b×(v+1), which is the output of the adder 304, to the flip-flop 303 (step S107), and the flip-flop 303 outputs the value (step S108). The horizontal count value is initialized to 0, and the vertical count value is incremented by one (step S107). As in the case of step S106, the flip-flops 203 and 303 output the values in step S108, and the determination in step S103 is then performed. Actually, the output in step S108 is performed in the next cycle.

The processes in steps S103 to S108 are iterated until the vertical count value reaches V−1 (YES in step S104). When the vertical count value is V−1 (YES in step S104), the values of a×u and b×v corresponding to all coordinates of the projection-transformed image are input to the flip-flops 203 and 303. In this case, the process returns to step S101 to process the next image.

Note that if the process of the divider 109 or 110, the image acquisition unit 12, or the interpolation processing unit 13 is not completed in one cycle, the selectors 205 and 305 may select the outputs of the flip-flops 203 and 303 and form a feedback loop independently of the above-described condition. This allows the flip-flops 203 and 303 to hold the same values as in the preceding cycle.

In the above-described way, the flip-flops 203 of the horizontal-direction processing units 101-1 to 101-3 output the values of the multiplicative expressions a×u, d×u, and g×u, respectively, in the raster scan order. Similarly, the flip-flops 303 of the vertical-direction processing units 102-1 to 102-3 output the values of the multiplicative expressions b×v, e×v, and h×v, respectively, in the raster scan order. The output values of the flip-flops 203 and 303 are input to the adders 106 to 108 and the dividers 109 and 110, as described above, and the respective calculations are executed. With these operations, the coordinate values (x, y) of the projection-transformed image are sequentially calculated in correspondence with (0, 0) to (H−1, V−1) of the coordinate values (u, v). Hardware in which a plurality of multipliers are arranged in parallel is unnecessary when performing projection transformation using an arbitrary parameter, and the circuit scale can be made small.

Note that the value of the matrix element of the inverse matrix is added to the multiplication result obtained by calculating the coordinate values of the conversion target image corresponding to given coordinate values, thereby calculating the coordinate values of the conversion target image for adjacent coordinate values. Hence, the order in which the process progresses does not matter. That is, in the above description, the process progresses in the row direction of the projection-transformed image. However, the process may progress in the column direction, and after the input to the flip-flops 203 and 303 is completed for one column, the process of the next column may be performed. In this case, for example, u and v are replaced in the above-described process. The values x and y are calculated by increasing v from 0 to V−1 while fixing u. When the vertical count value has reached V−1, u is incremented by one to process the next column.

The process may start from a pixel on the right side or lower side. When the process progresses from the right side to the left side, the element generator 201 may hold "−a". Instead, the adder 204 may execute a subtraction process. Similarly, when the process progresses from the lower side to the upper side, the element generator 301 may hold "−b". Instead, the adder 304 may execute a subtraction process. That is, the adders 204 and 304 may be adder-subtracters capable of executing addition and subtraction in accordance with the position of coordinates given as the initial coordinates or the order in which the process progresses. In addition, predetermined coordinate elements in the horizontal and vertical directions may be given as the initial coordinates. Simultaneously, the multiplication result of each coordinate element and the matrix element of the inverse matrix may be given as the initial value of the multiplication result, and the multiplication result may be output sequentially from the coordinates adjacent to the initial coordinates. In this case, adders-subtracters may be used in place of the adders 204 and 304 to execute subtraction of the matrix element for the adjacent coordinates on the left side or upper side and addition of the matrix element for the adjacent coordinates on the right side or lower side.

Note that in the above-described image processing apparatus 1, the elements a to h of the inverse matrix are output from a plurality of element generators. However, if the image processing apparatus is used to do projection transformation by a specific transformation matrix for image rotation or the like, some or all of the elements of the inverse matrix may be output from constant generators. In the above description, the three horizontal-direction processing units 101-1 to 101-3 independently output the multiplication results. If two horizontal-direction processing units always output identical values, the two horizontal-direction processing units may be integrated. That is, the image processing apparatus 1 need only include one horizontal-direction processing unit. This also applies to the vertical-direction processing units. If one of the values of the multiplicative expressions a×u, d×u, and g×u is always a constant, the horizontal-direction processing unit corresponding to the multiplicative expression may be replaced with a constant generator for outputting the constant. This also applies to the vertical-direction processing units. The interpolation process performed by the interpolation processing unit 13 of the image processing apparatus 1 has been described as a bilinear interpolation process. However, any other method such as bicubic interpolation may be used.

Figure 6:
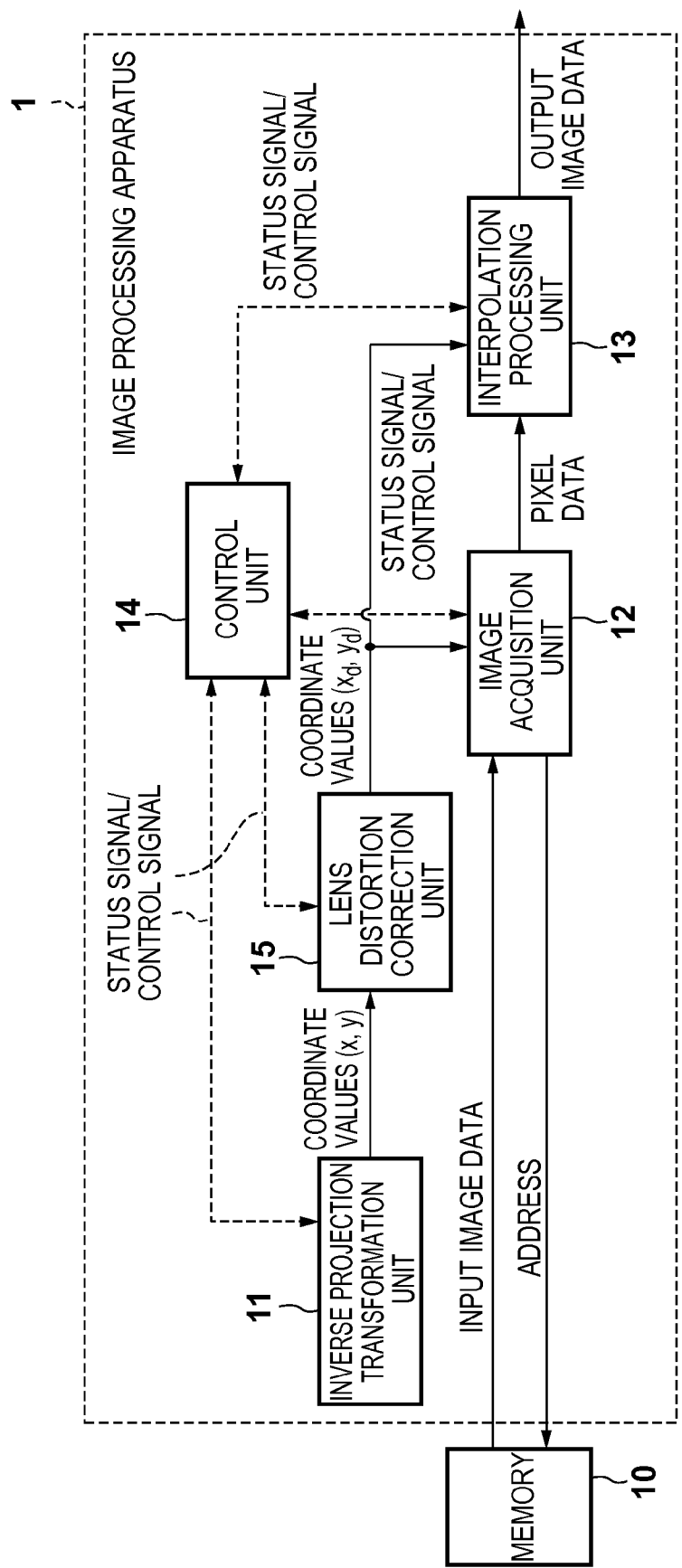
FIG. 6 is a block diagram showing an example of the arrangement of an image processing apparatus according to an embodiment.
Figure 7:
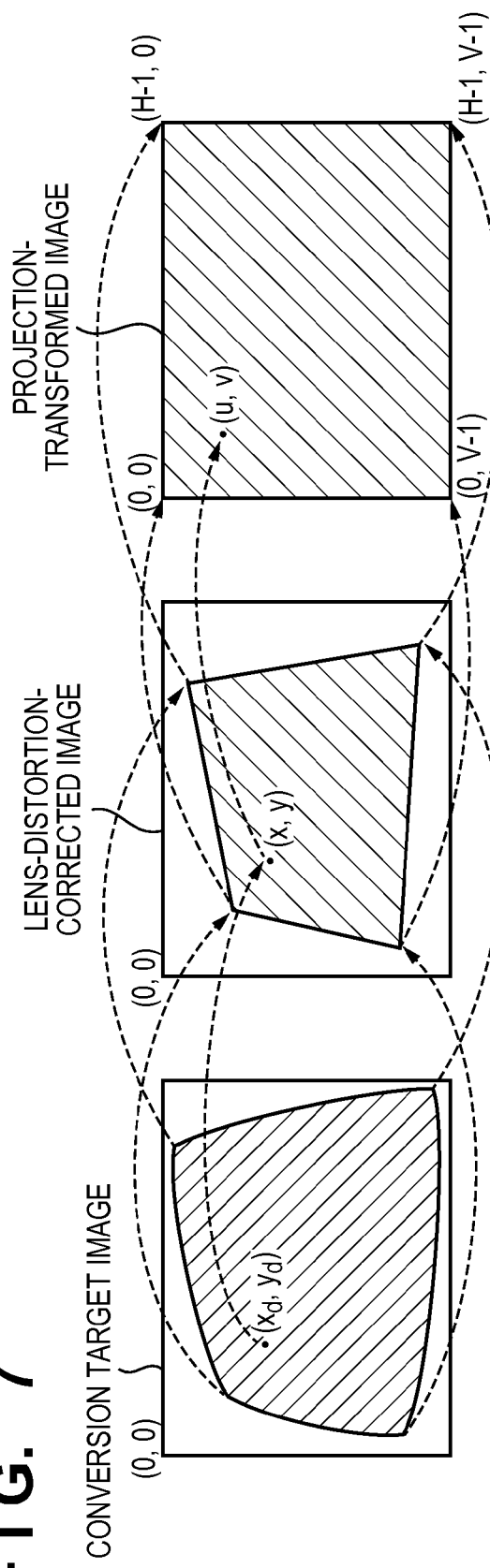
FIG. 7 is a view showing an example of image conversion in the image processing apparatus according to the embodiment.

FIG. 6 is a block diagram showing the arrangement of an image processing apparatus according to an embodiment. FIG. 7 shows an example of image conversion in the image processing apparatus according to this embodiment. An image processing apparatus 1 converts the four vertices of an arbitrary quadrilateral portion (hatched portion) on a nonlinear-transformed image generated by nonlinear transformation of a conversion target image using a transformation matrix that is a regular matrix such that the four vertices match the four vertices of a rectangle, thereby generating a converted image. A description will be made below assuming that conversion using a transformation matrix that is a regular matrix is projection transformation as an example thereof, a converted image is a projection-transformed image, nonlinear transformation is lens distortion correction, and a nonlinear-transformed image is a lens-distortion-corrected image. Lens distortion correction is correction of removing a lens distortion on a conversion target image, which occurs due to the optical characteristic of a lens.

The image processing apparatus 1 further includes a lens distortion correction unit 15 in addition to the arrangement shown in FIG. 1. The position of each pixel of a projection-transformed image generated by the image processing apparatus 1 is represented by coordinate values (u, v), and the position of each pixel of a lens-distortion-corrected image at an intermediate stage is represented by coordinate values (x, y). Note that the coordinate values (u, v) and the coordinate values (x, y) correspond to second coordinate values in an image after projection transformation and first coordinate values in an image before conversion in this embodiment, respectively. In this embodiment, third coordinate values ($x_d$, $y_d$) representing the position of each pixel in a conversion target image that is an image before nonlinear transformation for obtaining the first coordinate values are handled. That is, the first coordinate values are obtained from the second coordinate values, and the third coordinate values are obtained from the first coordinate values. The third coordinate values and the second coordinate values are thus associated with each other. A pixel value necessary for interpolation is extracted from the third coordinate values and the image before nonlinear transformation. A pixel value after conversion is then calculated and output.

In this embodiment as well, the projection-transformed image is assumed to include H pixels in the horizontal direction and V pixels in the vertical direction. Since the arrangements and operations of an inverse projection transformation unit 11 and an interpolation processing unit 13 are the same as in FIG. 1, and a description thereof will be omitted.

An image acquisition unit 12 issues an address to a memory 10 that saves the conversion target image based on the third coordinate values ($x_d$, $y_d$) calculated by the lens distortion correction unit 15, and reads out image data. A control unit 14 receives status signals representing the states of the respective functional units and generates a control signal to control each functional unit.

Figure 8:
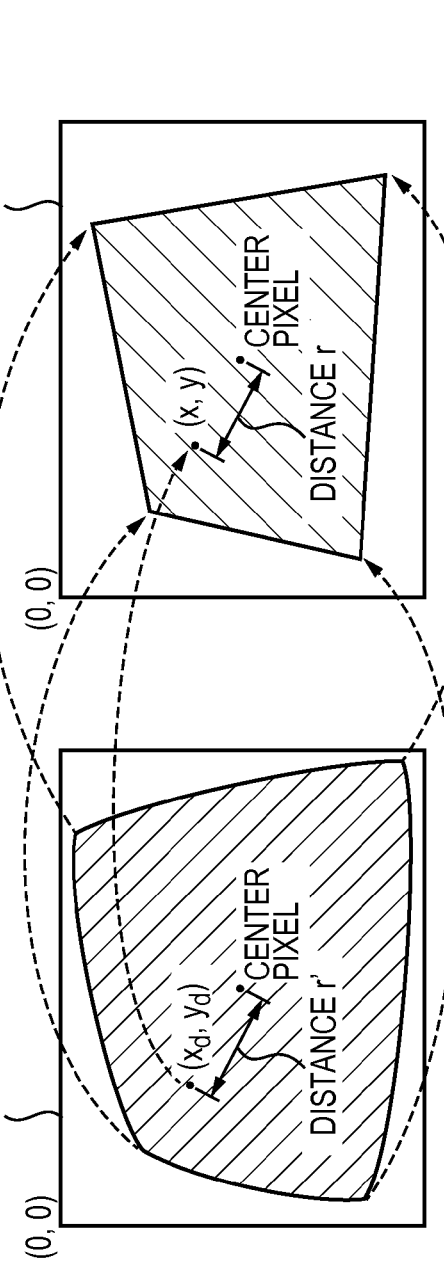
FIG. 8 is a view showing a conversion process of lens distortion correction.

The lens distortion correction unit 15 outputs the third coordinate values ($x_d$, $y_d$) representing the position of a pixel on the conversion target image, which are necessary for generating a pixel on the first coordinate values (x, y) of the lens-distortion-corrected image. FIG. 8 shows details of a conversion process of lens distortion correction. If there is no lens distortion caused by the optical characteristic of a lens, the lens-distortion-corrected image shown in FIG. 8 is obtained as the captured image. A distance r represents the distance between the first coordinate values (x, y) and the center pixel. However, when a lens distortion exists, the distance between the center pixel and the third coordinate values ($x_d$, $y_d$) corresponding to the first coordinate values (x, y) changes to r', and the image is distorted, as shown in FIG. 8. Let k be the distortion coefficient. The relationship between r and r' is represented by $$r' = k \times r \qquad (3)$$

Note that the distortion coefficient k changes depending on the distance from the center pixel.

To remove the lens distortion, the third coordinate values ($x_d$, $y_d$) are calculated for the distance r' corresponding to the distance r between the center coordinate values and the first coordinate values (x, y) on the lens-distortion-corrected image. For example, the relationship between the distance r and the distance r' or the relationship between the distance r and the distortion coefficient k is registered in a lookup table in advance, and the third coordinate values are acquired by looking up this table.

The procedure of a process according to this embodiment will be explained next. First, the inverse projection transformation unit 11 sequentially outputs the first coordinate values (x, y) on the image before projection transformation, that is, the lens-distortion-corrected image, which correspond to the second coordinate values (u, v) of the projection-transformed image, under the control of the control unit 14. Next, the lens distortion correction unit 15 receives the first coordinate values (x, y) output from the inverse projection transformation unit 11 and sequentially outputs the third coordinate values ($x_d$, $y_d$). The second coordinate values (u, v) of the projection transformed image and the third coordinate values $(x_d, y_d)$ are thus associated with each other.

Based on the third coordinate values $(x_d, y_d)$, the image acquisition unit 12 transmits, to the memory 10, a memory address at which the pixel value to be used by the interpolation processing unit 13 is saved, and reads out input image data. The image acquisition unit 12 outputs pixel data to the interpolation processing unit 13. In this embodiment, to perform the bilinear interpolation process, the image acquisition unit 12 outputs the pixel data of four pixels around the coordinate values $(x_d, y_d)$. Finally, the interpolation processing unit 13 performs the bilinear interpolation process using the pixel data and the fractional parts of the coordinate values $(x_d, y_d)$. With this process, the pixel value on the second coordinate values $(u, v)$ of the projection-transformed image is calculated, and the interpolation processing unit 13 outputs the projection-transformed image as output image data.

The nonlinear transformation of the image processing apparatus 1 according to the present invention has been described as conversion by the lens distortion correction unit 15. However, any other nonlinear transformation may be used, or a plurality of nonlinear transformations may be executed between the inverse projection transformation unit 11 and the image acquisition unit 12.

According to this embodiment, the coordinates to be referred to can easily be obtained even for image processing including nonlinear transformation. In addition, since the multiplication count can be suppressed in projection transformation, the number of calculation circuits necessary for the whole process can be decreased.

Second Embodiment

In this embodiment, an inverse projection transformation unit 11 divides a projection-transformed image into blocks and substitutes coordinate values $(u, v)$ in each block into equations (2) in the raster scan order to calculate corresponding output coordinate values $(x, y)$. In the following explanation, focus is placed on parts different from FIG. 1, and a description of the same arrangements and operations as in FIG. 1 such as the arrangements and operations of an image acquisition unit 12, an interpolation processing unit 13, and a control unit 14 will be omitted. A lens distortion correction unit 15 corrects the output of the inverse projection transformation unit 11, as shown in FIG. 6. In the following description, the minimum value of a coordinate element u in the horizontal direction is 0, and the maximum value is H−1, whereas the minimum value of a coordinate element v in the vertical direction is 0, and the maximum value is V−1 based on the number of pixels after projection transformation.

Figure 9:
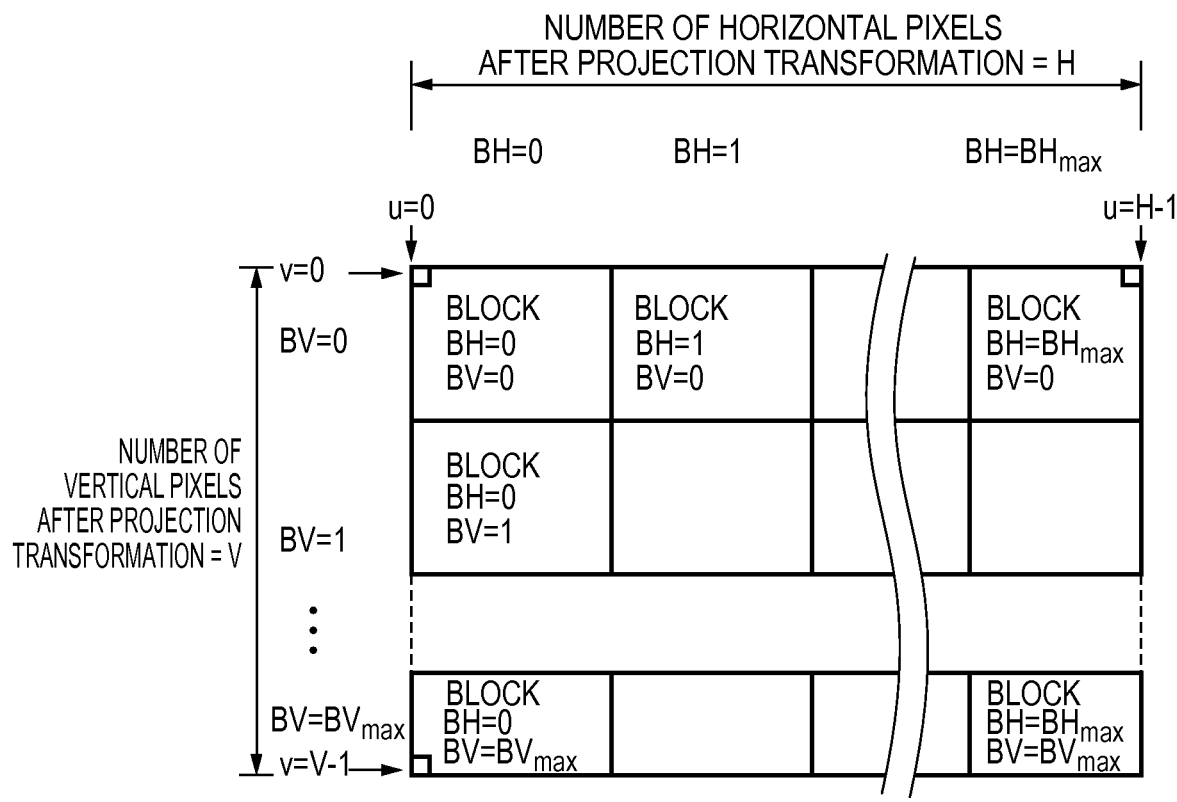
FIG. 9 is a view showing an example of division of a projection-transformed image into blocks.
Figure 10:
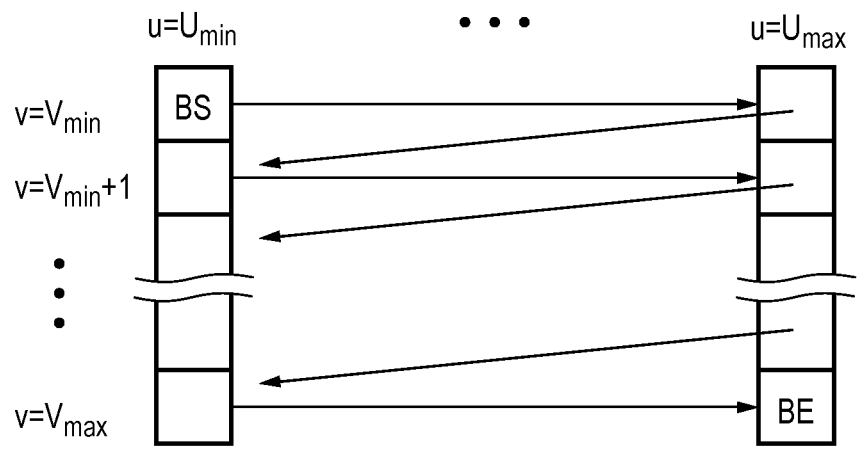
FIG. 10 is a view showing the process order of coordinate values (u, v) in each block.

FIG. 9 shows an example of division into blocks, plotting u along the abscissa and v along the ordinate. FIG. 10 shows a detailed substitution order of the coordinate values $(u, v)$ in each block into equations (2). Note that the number of pixels of one block is, for example, the power of a natural number having 2 as the base and a natural number as the exponent in both the horizontal direction and the vertical direction except the right end and the lower end. The number of pixels in the horizontal direction is assumed to be $2^N$, and the number of pixels in the vertical direction is assumed to be $2^M$. The exponents N and M are integers of 0 or more. They can be determined arbitrarily and are not changed during the process of one image. Note that if the remainder (H mod $2^N$) is not 0, the number of horizontal pixels of a block at the right end equals the value, and if the remainder is 0, the number of horizontal pixels of the block is $2^N$. Similarly, if the remainder (V mod $2^M$) is not 0, the number of vertical pixels of a block at the lower end equals the value, and it the remainder is 0, the number of vertical pixels of the block is $2^M$.

Referring to FIG. 9, BH is an integer value of 0 or more which designates the block position in the horizontal direction. The minimum value is 0, and the maximum value is $BH_{max}$. $BH_{max}$ is a minimum integer of $H+2^N-1$ or more. Similarly, BV is an integer value of 0 or more which designates the block position in the vertical direction. The minimum value is 0, and the maximum value is $BV_{max}$. $BV_{max}$ is a minimum integer of $V+2^M-1$ or more.

In this embodiment, the process starts from a block of BH=0 and BV=0. When the process of one block is completed, the process sequentially advances to the adjacent block on the right side. When the process of a block of BH=$BH_{max}$ is completed, BV is incremented by one, and BH is retuned to 0. Then, the process advances to the next row of blocks. After that, the process is sequentially executed up to a block of BH=$BH_{max}$ and BV=$BV_{max}$. Note that the order of the process is merely an example. After the process of one block is completed, the process may advance to the adjacent block on the lower side. Alternatively, the process may start from a block on the lower side or right side.

As shown in FIG. 10, let $U_{min}$ be the minimum coordinate value of u in a single block, $U_{max}$ be the maximum coordinate value, $V_{min}$ be the minimum coordinate value of v, and $V_{max}$ be the maximum coordinate value. Except the blocks at the right end, $U_{min}=2^N \times BH$, and $U_{max}=2^N \times (BH+1)-1$. Similarly, except the blocks at the lower end, $V_{min}=2^M \times BV$, and $V_{max}=2^M \times (BV+1)-1$. In the blocks at the right end, $U_{max}=H-1$. In the blocks at the lower end, $V_{max}=V-1$.

As for the process in each block, calculation starts from the coordinate values $(x, y)$ corresponding to coordinate values BS=$(u, v)$=$(U_{min}, V_{min})$ at the upper left. Subsequently, the coordinate values $(x, y)$ corresponding to one row of the block are sequentially calculated up to the coordinate values $(u, v)$=$(U_{max}, V_{min})$ in the horizontal direction while incrementing u by one. Next, u is returned to $U_{min}$, and v is incremented by one. Then, the coordinate values $(x, y)$ of the conversion target image corresponding to the next one row are calculated from the coordinate values $(U_{min}, V_{min}+1)$ to $(U_{max}, V_{min}+1)$. This process is iterated until the coordinate values $(x, y)$ corresponding to coordinate values BE=$(u, v)$=$(U_{max}, V_{max})$ at the lower right are calculated. This operation is the same as in the first embodiment except that the process is executed not for the entire projection-transformed image but for each block obtained by dividing the projection-transformed image.

(Arrangement of Inverse Projection Transformation Unit)

Figure 11:
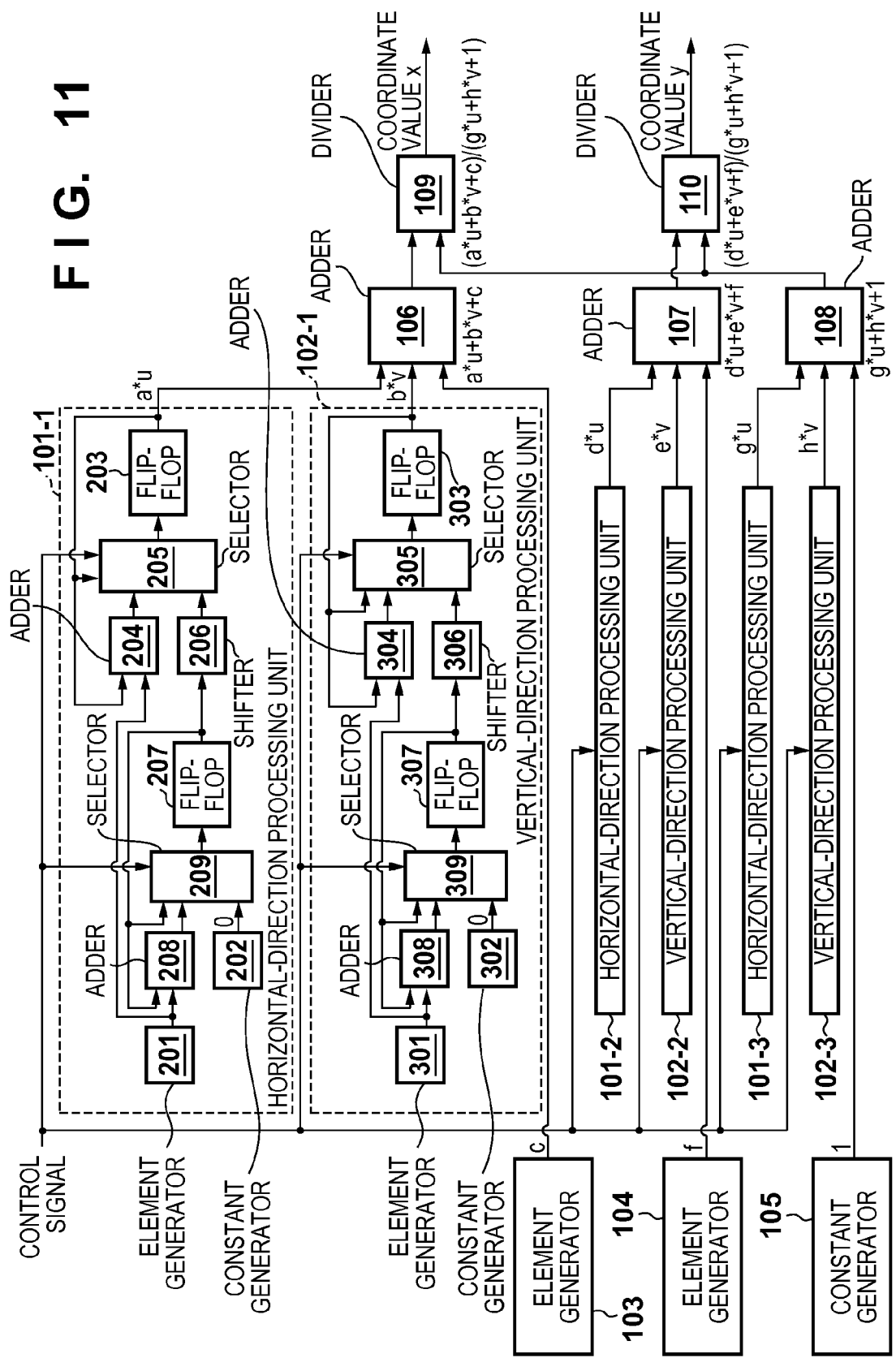
FIG. 11 is a block diagram showing an example of the internal arrangement of an inverse projection transformation unit according to the second embodiment.

FIG. 11 shows the internal arrangement of the inverse projection transformation unit 11. The same reference numerals as in FIG. 4 denote blocks having the same functions, and a description thereof will be omitted. In the inverse projection transformation unit 11 according to this embodiment, each of horizontal-direction processing units 101-1 to 101-3 further includes a shifter 206, a second flip-flop 207, a second adder 208, and a second selector 209 in addition to the arrangement shown in FIG. 4. Similarly, each of vertical-direction processing units 102-1 to 102-3 further includes a shifter 306, a second flip-flop 307, a second adder 308, and a second selector 309.

The second flip-flops 207 and 307 delay the inputs by one cycle based on an operation clock supplied from a clock source (not shown) and output the values to the shifters 206 and 306, respectively. The shifter 206 of the horizontal-direction processing unit 101-1 is an arithmetic shifter which shifts the input value to the left by N bits and outputs the shifted value to a first selector 205. On the other hand, the shifter 306 of the vertical-direction processing unit 102-1 is an arithmetic shifter which shifts the input value to the left by M bits and outputs the shifted value to a first selector 305. The second adders 208 and 308 output the added result of the output value of the second flip-flop 207 and the output value of an element generator 201 and the added result of the output value of the second flip-flop 307 and the output value of an element generator 301, respectively. The second selectors 209 and 309 select values to be output to the second flip-flops 207 and 307, respectively, based on a signal from the control unit 14.

(Process of Inverse Projection Transformation Unit)

The detailed operation of each unit of the inverse projection transformation unit 11 will be described below with reference to FIGS. 12 and 13.

Figure 12:
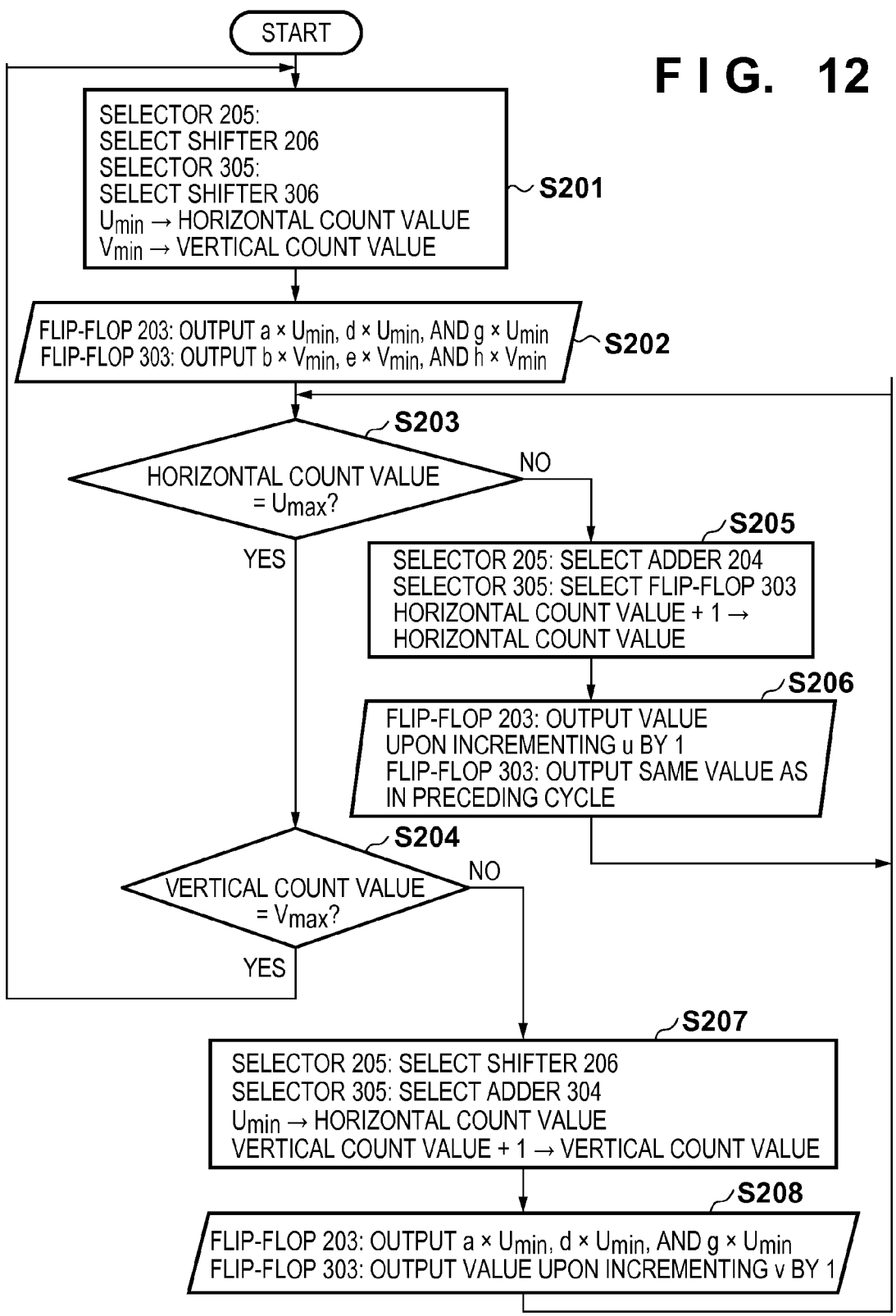
FIG. 12 is a flowchart showing the control operation of the inverse projection transformation unit according to the second embodiment.
Figure 13:
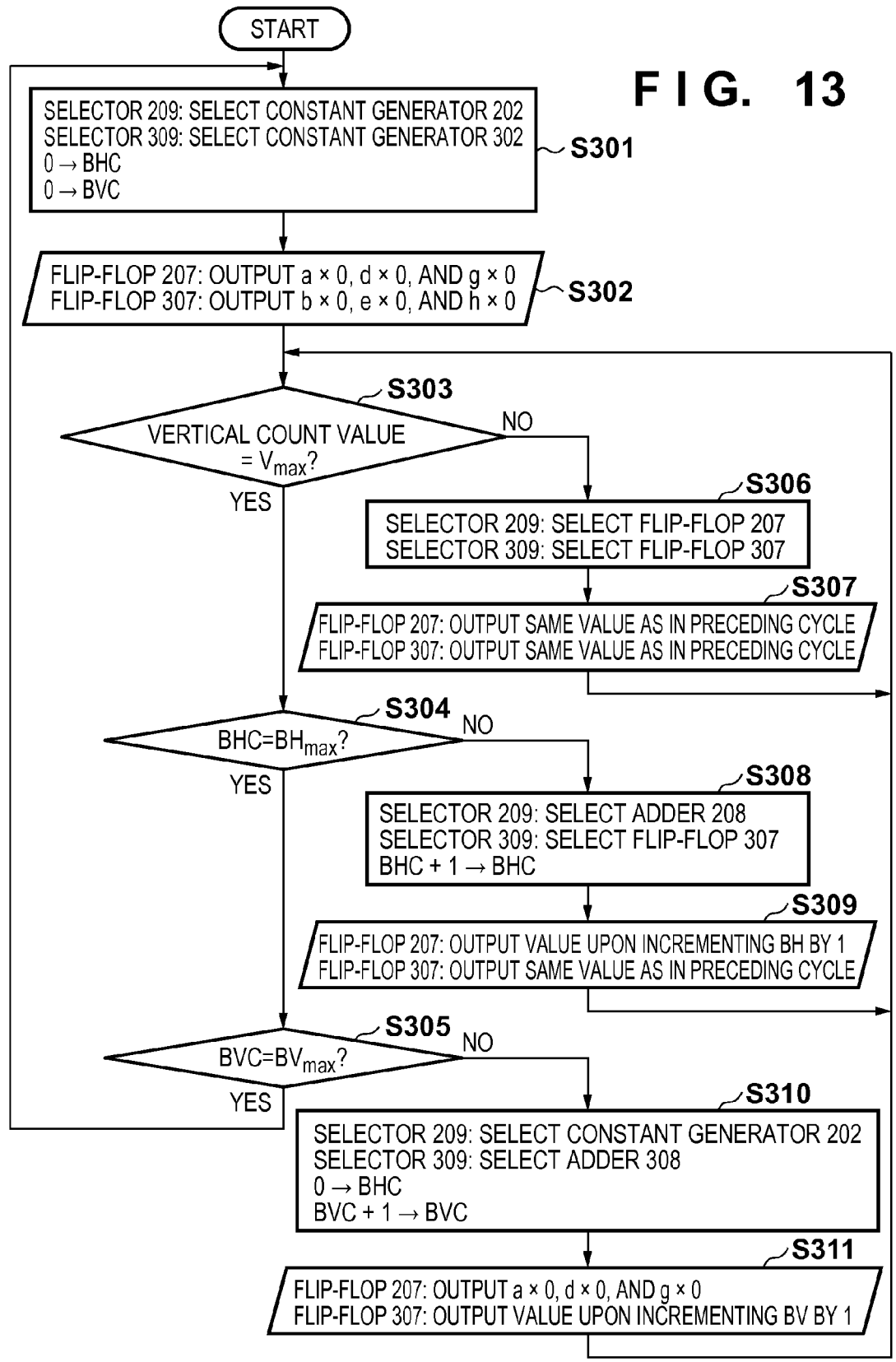
FIG. 13 is a flowchart showing the control operation of the inverse projection transformation unit according to the second embodiment.

FIGS. 12 and 13 are flowcharts showing the control operations of the horizontal-direction processing units and the vertical-direction processing units in the inverse projection transformation unit 11 according to this embodiment. Note that the first horizontal-direction processing unit 101-1 and the first vertical-direction processing unit 102-1 will be explained below. The remaining horizontal-direction processing units and the remaining vertical-direction processing units also perform the same operations.

In the inverse projection transformation unit 11 according to this embodiment, first selectors 205 and 305 and the second selectors 209 and 309 are controlled by the horizontal count value and the vertical count value from the control unit 14, as in the first embodiment. The second selectors 209 and 309 are also controlled by a horizontal-direction block counter BHC and a vertical-direction block counter BVC concerning a block position.

Note that the horizontal count value whose initial value is $U_{min}$ is incremented by one every time the first selector 205 selects the output of a first adder 204, and initialized to $U_{min}$ after having reached $U_{max}$. The vertical count value whose initial value is $V_{min}$ is incremented by one every time the first selector 305 selects the output of a first adder 304, and initialized to $V_{min}$ after having reached $V_{max}$. That is, $U_{max}$ and $V_{max}$ are the initialization conditions of the horizontal count value and the vertical count value, respectively. As described above, $U_{min}=2^N \times BH$, and $U_{max}=2^N \times (BH+1)-1$. Similarly, $V_{min}=2^M \times BV$, and $V_{max}=2^M \times (BV+1)-1$. For this reason, the initial values and the initialization conditions of the count values can easily be obtained by adding only $2^N$ or $2^M$ to the original initial value and initialization condition every time BH or BV that is a value for designating the block position is incremented by one. Note that when making the process progress from the right side to the left side or from the lower side to the upper side, only $2^N$ or $2^M$ is subtracted.

In this embodiment, the shifters 206 and 306 bit-shift the outputs from the second flip-flops 207 and 307 to obtain the values (x, y) corresponding to the coordinates at the upper left of each block, and sets the values as the initial values of outputs in the block. For example, the process is performed in the following way. The coordinates at the upper left of each block are $(U_{min}, V_{min})=(2^N \times BH, 2^M \times BV)$, as described above. A value $a \times BH \times 2^N$ is obtained by shifting $a \times BH$ by N bits. Hence, when the second adder 208 and the second selector 209 are controlled so that the second flip-flop 207 outputs $a \times BH$, the shifter 206 outputs the result of an expression $a \times u$ corresponding to the coordinate u at the left end of each block. Similarly, when control is done so that the second flip-flop 307 in the vertical-direction processing unit 102-1 outputs $b \times BV$, the shifter 306 outputs the result of an expression $b \times v$ corresponding to the coordinate v at the upper end of each block. A detailed operation will be explained below.

The procedure shown in FIG. 12 is basically the same as the procedure shown in FIG. 5. However, as described above, the initial values and the initialization conditions of the horizontal count value and the vertical count value are different. Also different is that when one of the horizontal count value and the vertical count value is the initial value, the first selector 205 or 305 selects not constant generator 202 or 302 but the shifter 206 or 306.

At the start of the process of each block, the first selector 205 selects the output of the shifter 206 (step S201), thereby setting the initial value of the output. The first selector 305 also selects the output of the shifter 306. First flip-flops 203 and 303 hold and output the output values of the shifters 206 and 306 (step S202). At this time, the shifter 206 outputs the value $a \times BH \times 2_M \times a \times U_{min}$, as described above. This value is $u=BH \times 2^N$, that is, the value of $a \times u$ corresponding to the coordinate at the left end of each block. Similarly, the shifter 306 outputs the value $b \times v$ corresponding to the coordinate at the upper end of each block, that is, $b \times BV \times 2^M$. Note that the initial values of BH and BV are, for example, 0. In this case, since the values held by the second flip-flops 207 and 307 are 0, the shifters 206 and 306 output "0".

Using the value output from the shifter 206 as the initial value of the output, the first selector 205 selects a value obtained by causing the first adder 204 to add a to the preceding output value every time the coordinate values are incremented by one in the horizontal direction (step S205). The first flip-flop 203 outputs the value obtained by adding a to the preceding output value (step S206). When the horizontal count value is $U_{max}$ (YES in step S203), it is determined whether the vertical count value is $V_{max}$ (step S204). If the vertical count value is not $V_{max}$ (NO in step S204), the horizontal count value is initialized to the initial value $U_{min}$ (step S207). The first selector 205 selects the shifter 206, and the initial value $2^N \times BH$ of the output in the horizontal direction in this block is input to the first flip-flop 203 (step S207). The first flip-flop 203 outputs the value output from the shifter 206, that is, $a \times U_{min}$ (step S208). The vertical count value is incremented by one. The first selector 305 selects a value obtained by causing the first adder 304 to add b to the preceding output value (step S207). The first flip-flop 303 outputs the value obtained by adding b to the preceding output value (step S208). The processes in steps S205 and S206 are iterated for the next row in the block. After that, when the vertical count value is $V_{max}$ (YES in step S204), it is determined that the input to the first flip-flops 203 and 303 is completed for all coordinates in the block, and the same process as described above is iterated for the next block or the next image.

Note that the value outputs by the first flip-flops 203 and 303 in steps S202, S206, and S208 are actually executed in the cycle next to the cycle in which steps S201, S205, and S207 are executed. The outputs in steps S202, S206, and S208 are executed in the same cycle as that of the processes in steps S203 to S205 and S207. That is, although step S203 is executed after steps S202, S206, and S208 in FIG. 12 for the sake of descriptive simplicity, the processes in steps S202, S206, and S208 and the process in step S203 are actually executed in the same cycle. That is, in the same cycle as that of the outputs in steps S202, S206, and S208, the first selectors 205 and 305 execute selection of the values to be output from the first flip-flops 203 and 303 in the next cycle.

An operation of generating values to be output from the shifters 206 and 306 will be described next with reference to FIG. 13. The values output from the shifters 206 and 306 are output values corresponding to the coordinate values ($U_{min}$, $V_{min}$) at the upper left of a block. That is, the shifters 206 and 306 output $a \times U_{min}$ and $b \times V_{min}$, respectively.

In each block $U_{min}=2^N \times BH$, and $a \times U_{min}$ can be obtained by an expression $a \times BH \times 2^N$. This calculation result is obtained by shifting a value obtained by multiplying the matrix element a by BH that is an integer of 0 or more and designates the block position in the horizontal direction to the left by N bits. In addition, $a \times BH$ is obtained as a result of adding a to 0 BH times. Similarly, $b \times V_{min}$ can be obtained by an expression $b \times BV \times 2^M$. This value is obtained by shifting a result of adding b to 0 BV times to the left by M bits.

For this reason, the second selector 209 operates such that the second flip-flop 207 outputs the value of $a \times BH$ in accordance with the integer BH for designating the block position in the horizontal direction. This output value is shifted to the left by N bits to obtain $a \times U_{min}$ at the left end of each row in the block. Similarly, the second selector 309 operates such that the second flip-flop 307 outputs the value of $b \times BV$ in accordance with the integer BV for designating the block position in the vertical direction. This output is shifted to the left by M bits to obtain $b \times V_{min}$ at the upper end of each block.

Note that the second selectors 209 and 309 are controlled based on, for example, the horizontal count value, the vertical count value, and the block position from the control unit 14. In the following description, the horizontal-direction block counter BHC and the vertical-direction block counter BVC are used to specify the block position. However, the block position may be specified by any other method. For example, whether the block under the process is the rightmost block may be specified by determining whether $U_{max}$ that is the initialization condition in the horizontal direction of the block is H−1. Similarly, whether the block under the process is the lowermost block may be specified by determining whether $V_{max}$ that is the initialization condition in the vertical direction of the block is V−1. In addition, when $U_{max}$ is H−1, and $V_{max}$ is V−1, the last block to be processed in one image may be specified. If the block position is specified in this way, the horizontal-direction block counter BHC and vertical-direction block counter BVC in the following explanation need not be used.

Before the start of the process of the first block, the second selector 209 selects the output of the constant generator 202 and inputs $a \times 0=0$ corresponding to BH=0 to the second flip-flop 207 (step S301). The second flip-flop 207 outputs 0 (step S302). The second selector 309 also selects the output of the constant generator 302 and outputs "0" to the second flip-flop 307 (step S301). The second flip-flop 307 also outputs 0 (step S302). At this time, both the shifters 206 and 306 output 0. After one cycle, the shifter 206 transits to a state to output $a \times 0=0$ when the minimum coordinate value u=0, and the shifter 306 transits to a state to output $b \times 0=0$ when the minimum coordinate value v=0. The horizontal-direction block counter BHC and the vertical-direction block counter BVC of the control unit 14 are initialized to 0 (step S301).

It is determined whether the vertical count value is $V_{max}$ (step S303). If the vertical count value is not $V_{max}$ (NO in step S303), the second selectors 209 and 309 select the outputs of the second flip-flops 207 and 307, respectively (step S306). That is, both the second flip-flops 207 and 307 maintain the same values as in the preceding cycle (step S307).

If the vertical count value is $V_{max}$ (YES in step S303), the process of the last row of the block currently under the process has started. For this reason, the first selector 205 has already referred to the value output from the shifter 206 (step S207 in FIG. 12), and never refers to the value output from the shifter 206 until the process advances to the next block (until the process advances to step S201 in FIG. 12). Similarly, the first selector 305 never refers to the value output from the shifter 306 until the process advances to the next block. Therefore, the values output from the shifters 206 and 306 are updated at this point of time.

At the time of updating, it is determined first whether the block currently under the process is the rightmost block in the horizontal direction, that is, whether BHC is $BH_{max}$ (step S304). If BHC is not $BH_{max}$ (NO in step S304), the block to be processed next is the adjacent block on the right side of the block under the process.

For this reason, the second selector 209 selects the output of the second adder 208 and outputs the value to the second flip-flop 207 (step S308). In addition, the horizontal-direction block counter BHC of the control unit 14 is incremented by one. The second adder 208 adds the output value of the element generator 201 to the output value of the second flip-flop 207. Hence, if the current output value of the second flip-flop 207 is $a \times BH$, $a \times BH+a=a \times (BH+1)$ is obtained, and the value of $a \times BH$ upon incrementing BH by one is output. On the other hand, since the block to be processed next is the adjacent block on the right side of the block under the process, the block position in the vertical direction does not vary. For this reason, the second selector 309 selects the output of the second flip-flop 307 to form a feedback loop (step S308). The second flip-flop 207 outputs the value from the second adder 208 to the shifter 206, and the second flip-flop 307 outputs the same value as in the preceding cycle to the shifter 306 (step S309). The above-described process is iterated until BHC reaches $BH_{max}$ (until YES in step S304). Note that instead of using BHC, whether $U_{max}$ is H−1 may be determined in the process of step S304, as described above.

If BHC is $BH_{max}$ (YES in step S304), it is determined next whether BVC is $BV_{max}$ (step S305). If BVC is not $BV_{max}$ (NO in step S305), the block to be processed next is the block at the left end of the row immediately under the block cruelty under the process.

For this reason, the second selector 209 selects the output of the constant generator 202 and inputs $a \times 0=0$ when BH=0 to the second flip-flop 207 (step S310). The process thus advances from the block at the right end to the block at the left end. At the same time, the value of the horizontal-direction block counter BHC is initialized to 0 (step S310). On the other hand, the second selector 309 selects the output of the second adder 308 and outputs the value to the second flip-flop 307, and the vertical-direction block counter BVC is incremented by one (step S310). The second adder 308 adds the output value of the element generator 301 to the output value of the second flip-flop 307. Hence, if the output value of the second flip-flop 307 is $b \times BV$, $b \times BV+b=b \times (BV+1)$ is obtained, and the value of $b \times BV$ upon incrementing BV by one is output. The second flip-flops 207 and 307 output the output value of the constant generator 202 and the output value of the second adder 308, respectively (step S311). The above-described process is iterated until BVC reaches $BV_{max}$ (until YES in step S305). If BVC is $BV_{max}$ (YES in step S305), it can be determined that the output selection of the shifters 206 and 306 by the first selectors 205 and 305 is completed for all blocks of one image. For this reason, the process returns to step S301 to wait for the process of the next image. Note that instead of using BVC, whether $V_{max}$ is V−1 may be determined in the process of step S305, as described above.

Note that the value outputs by the second flip-flops 207 and 307 in steps S302, S307, S309, and S311 are actually executed in the cycle next to the cycle in which steps S301, S306, S308, and S310 are executed. The outputs in steps S302, S307, S309, and S311 are executed in the same cycle as that of the processes in steps S303 to S306, S308, and S310. That is, although step S303 is executed after steps S302, S307, S309, and S311 in FIG. 13 for the sake of descriptive simplicity, the processes in steps S302, S307, S309, and S311 and the process in step S303 are actually executed in the same cycle. That is, in the same cycle as that of the outputs in steps S302, S307, S309, and S311, the second selectors 209 and 309 execute selection of the values to be output from the second flip-flops 207 and 307 in the next cycle.

In the above-described way, the first flip-flops 203 of the horizontal-direction processing units 101-1 to 101-3 output the values of the multiplicative expressions a×u, d×u, and g×u, respectively, in the raster scan order in each block on the block basis. Similarly, the first flip-flops 303 of the vertical-direction processing units 102-1 to 102-3 output the values of the multiplicative expressions b×v, e×v, and h×v, respectively, in the raster scan order in each block on the block basis. According to this embodiment, since the projection-transformed image can be output on the block basis, the buffer memory to the image coding processing unit at the succeeding stage can be reduced.

Note that in the above description, both the constant generators 202 and 302 output 0. However, this aims at starting the process from the block at the upper left, and the present invention is not limited to this. For example, to start the process from a predetermined block other than the block at the upper left, the constant generators 202 and 302 may hold values obtained by multiplying the integers BH and BV for designating the block by the matrix elements of the inverse matrix, respectively. In addition, the second adders 208 and 308 may be adder-subtracters which, when processing the adjacent block on the right side or lower side, add the matrix elements to the values, and when processing the adjacent block on the left side or upper side, subtract the matrix elements from the values.

In the above description, the image is divided in both the horizontal and vertical directions. However, the image may be divided only in one direction. More specifically, the image may be divided only in the horizontal direction, and BV may always be 0. Alternatively, the image may be divided only in the vertical direction, and BH may always be 0. The block division can freely be done and may be changed in accordance with the subsequent process.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 201.2-042387, filed Feb. 28, 2012, which is hereby incorporated by reference herein in its entirety.

What is claimed is:

1. An image conversion apparatus for converting an input image into an output image, the apparatus comprising a processor and a memory including instructions which, when executed by the processor, configure the apparatus to:
   execute, based on a first value used to obtain a first coordinate value in a nonlinear-transformed image, which corresponds to a coordinate value of one pixel in the output image, a first calculation for obtaining a second value used to obtain a second coordinate value in the nonlinear-transformed image, which corresponds to a coordinate value of a pixel adjacent to the one pixel in the output image;
   execute a second calculation for obtaining the second coordinate value using the second value obtained by the first calculation;
   execute coordinate conversion of converting the second coordinate value obtained by the second calculation into a third coordinate value in the input image; and
   execute image conversion of converting the input image into the output image, based on the third coordinate value converted by the coordinate conversion,
   wherein the nonlinear-transformed image corresponds to an image obtained by performing a predetermined nonlinear transformation on the input image,
   wherein the output image corresponds to an image obtained by transforming the nonlinear-transformed image using a transformation matrix, and
   wherein one of addition and subtraction is iteratively executed using a result of the first calculation and a predetermined constant so as to sequentially output a value corresponding to a multiplication result obtained by multiplying a coordinate value of each of a plurality of adjacent pixels in the output image by the predetermined constant.

2. The apparatus according to claim 1, wherein, in the coordinate conversion, the second coordinate value is nonlinearly transformed into the third coordinate value.

3. The apparatus according to claim 1, wherein, in the coordinate conversion, the second coordinate value is converted into the third coordinate value in accordance with a distance between a predetermined position and a position corresponding to the second coordinate value.

4. The apparatus according to claim 1, wherein, in the coordinate conversion, the second coordinate value is converted into the third coordinate value to correct a lens distortion.

5. The apparatus according to claim 1, wherein, in the second calculation, the second coordinate value in the nonlinear-transformed image, which corresponds to the coordinate value of the adjacent pixel in the output image, is obtained to convert four vertices in the nonlinear-transformed image into four vertices in the output image.

6. The apparatus according to claim 1, wherein, in the first calculation, calculation of sequentially obtaining the second value used to obtain the second coordinate value in the nonlinear-transformed image, which corresponds to the coordinate value of a pixel adjacent to each of a plurality of pixels on one line in the output image is iteratively executed for each line.

7. The apparatus according to claim 1, wherein, in the first calculation, for each of a plurality of blocks obtained by dividing the output image, the second value used to obtain the second coordinate value in the nonlinear-transformed image, which corresponds to the coordinate value of a pixel adjacent to each of a plurality of pixels in each of the plurality of blocks is sequentially obtained.

8. An image conversion apparatus comprising a processor and a memory including instructions which, when executed by the processor, configure the apparatus to:

execute, based on a first value used to obtain a coordinate value in an input image, which corresponds to a coordinate value of one pixel in an output image, calculation for obtaining a second value used to obtain a coordinate value in the input image, which corresponds to a coordinate value of a pixel adjacent to the one pixel in the output image; and convert an image, based on the obtained second value, wherein the output image corresponds to an image obtained by transforming the input image using a transformation matrix, and wherein, for each of a plurality of blocks obtained by dividing the output image, one of addition and subtraction is iteratively executed using a result of the calculation and a predetermined constant as inputs so as to sequentially output a value corresponding to a multiplication result obtained by multiplying a coordinate value of a pixel adjacent to each of a plurality of pixels in each of the plurality of blocks by the predetermined constant.

9. The apparatus according to claim 8, wherein the calculation of obtaining the value used to obtain the coordinate value in the input image, which correspond to the coordinate value of the adjacent pixel in the output image, is executed to convert four vertices in the input image into four vertices in the output image.

10. An image conversion method of an image conversion apparatus for converting an input image into an output image, the method comprising:

executing, based on a first value used to obtain a first coordinate value in a nonlinear-transformed image, which corresponds to a coordinate value of one pixel in the output image, first calculation for obtaining a second value used to obtain a second coordinate value in the nonlinear-transformed image, which corresponds to a coordinate value of a pixel adjacent to the one pixel in the output image;

executing second calculation for obtaining the second coordinate value using the second value obtained by the first calculation;

executing coordinate conversion of converting the second coordinate value obtained by the second calculation into a third coordinate value in the input image; and executing image conversion of converting the input image into the output image, based on the third coordinate value converted by the coordinate conversion, wherein the nonlinear-transformed image corresponds to an image obtained by performing a predetermined nonlinear transformation on the input image, wherein the output image corresponds to an image obtained by transforming the nonlinear-transformed image using a transformation matrix, and wherein, in the first calculation, one of addition and subtraction is iteratively executed using a result of the first calculation and a predetermined constant so as to sequentially output a value corresponding to a multiplication result obtained by multiplying a coordinate value of each of a plurality of adjacent pixels in the output image by the predetermined constant.

11. The method according to claim 10, wherein, in the coordinate conversion, the second coordinate value is nonlinearly transformed into the third coordinate value.

12. The method according to claim 10, wherein, in the coordinate conversion, the second coordinate value is converted into the third coordinate value in accordance with a distance between a predetermined position and a position corresponding to the second coordinate value.

13. The method according to claim 10, wherein, in the coordinate conversion, the second coordinate value is converted into the third coordinate value to correct a lens distortion.

14. The method according to claim 10, wherein, in the second calculation, the second coordinate value in the nonlinear-transformed image, which corresponds to the coordinate value of the adjacent pixel in the output image, are obtained to convert four vertices in the nonlinear-transformed image into four vertices in the output image.

15. An image conversion method of an image conversion apparatus, comprising:

executing, based on a first value used to obtain a coordinate value in an input image, which corresponds to a coordinate value of one pixel in an output image, calculation for obtaining a second value used to obtain a coordinate value in the input image, which corresponds to a coordinate value of a pixel adjacent to the one pixel in the output image; and converting an image to be converted, based on the second value obtained by the calculation, wherein the output image corresponds to an image obtained by transforming the output image using a transformation matrix, and wherein, in the calculation, one of addition and subtraction is iteratively executed using an output of the calculation and a predetermined constant for each of a plurality of blocks obtained by dividing the output image so as to sequentially output a value corresponding to a multiplication result obtained by multiplying a coordinate value of a pixel adjacent to each of a plurality of pixels in each of the plurality of blocks by the predetermined constant.

16. The method according to claim 15, wherein, in the calculation, the calculation of obtaining the value used to obtain the coordinate value in the input image, which corresponds to the coordinate value of the adjacent pixel in the output image after the image conversion, is executed to convert four vertices in the input image into four vertices in the output image.

17. A non-transitory storage medium storing a computer program for converting an input image into an output image, the computer program comprising:

executing, based on a first value used to obtain a first coordinate value in a nonlinear-transformed image, which corresponds to a coordinate value of one pixel in the output image, first calculation for obtaining a second value used to obtain a second coordinate value in the nonlinear-transformed image, which corresponds to a coordinate value of a pixel adjacent to the one pixel in the output image;

executing second calculation for obtaining the second coordinate value using the second value obtained by the first calculation;

executing coordinate conversion of converting the second coordinate value obtained by the second calculation into a third coordinate value in the input image; and executing image conversion of converting the input image into the output image, based on the third coordinate value converted by the coordinate conversion, wherein the nonlinear-transformed image corresponds to an image obtained by performing a predetermined nonlinear transformation on the input image, wherein the output image corresponds to an image obtained by transforming the nonlinear-transformed image using a transformation matrix, and wherein, in the first calculation, one of addition and subtraction is iteratively executed using a result of the first calculation and a predetermined constant so as to sequentially output a value corresponding to a multiplication result obtained by multiplying a coordinate value of each of a plurality of adjacent pixels in the output image by the predetermined constant.

18. The apparatus according to claim 1, wherein a product of a predetermined coordinate element and a matrix element of an inverse matrix of a conversion matrix is held as an initial value, wherein the conversion matrix correlates a coordinate value of one pixel in the nonlinear-transformed image with a coordinate value in the output image, and
wherein calculation of the multiplication result is started from a coordinate value including the predetermined coordinate element in the output image and sequentially calculates, as the multiplication result, a product of a coordinate element of one pixel in the output image and a matrix element of the inverse matrix.

19. The apparatus according to claim 18, further comprising a shifter for bit shifting an input value to the left by a predetermined natural number of bits,
wherein the predetermined coordinate element and the initial value for each of the plurality of blocks that has a width or a height, of which the number of pixels is a power of a number having 2 as a base and a natural number as an exponent, is set,
wherein the predetermined coordinate element set for each of the plurality of blocks has a value obtained by multiplying a power of a number having 2 as a base and a natural number as an exponent by an integer value of 0 or more which is designated by a position of the block, and
wherein the initial value set for each of the plurality of blocks is a value obtained by the shifter bit shifting a value obtained by multiplying the matrix element by the integer value.

20. The apparatus according to claim 19, wherein the instructions further cause the apparatus to add the matrix element to or subtract the matrix element from a value obtained for the block by multiplying the matrix element by the integer value,
wherein the shifter calculates the initial value for another block adjacent to the block by bit shifting a calculation result to the left by the predetermined natural number of bits.

21. An image conversion apparatus, comprising a processor and a memory including instructions which, when executed by the processor, cause the apparatus to:
execute, based on a first value used to obtain a first coordinate value in an area, which corresponds to a coordinate value of one pixel in a converted image, calculation of obtaining a second value used to obtain a second coordinate value in the area, which corresponds to a coordinate value of a pixel adjacent to the one pixel in the converted image;
execute calculation of obtaining the second coordinate value using the obtained second value;
execute coordinate conversion of converting the obtained second coordinate value into a third coordinate value in an image to be converted into the area; and
execute image conversion of converting the image into the converted image, based on the converted third coordinate value,
wherein one of addition and subtraction is iteratively executed using a result of the first calculation and a predetermined constant so as to sequentially output a value corresponding to a multiplication result obtained by multiplying a coordinate value of each of a plurality of adjacent pixels in the converted image by the predetermined constant.

22. The apparatus according to claim 21, wherein the second coordinate value is nonlinearly transformed into the third coordinate value.

23. The apparatus according to claim 21, wherein the second coordinate value is converted into the third coordinate value in accordance with a distance between a predetermined position and a position corresponding to the second coordinate value.

24. The apparatus according to claim 21, wherein, in the coordinate conversion, the second coordinate value is converted into the third coordinate value to correct a lens distortion.

25. The apparatus according to claim 21, wherein the second coordinate value is obtained in the area, which correspond to the coordinate value of the adjacent pixel in the converted image, to convert four vertices in the area into four vertices in the converted image.

26. An image conversion method of an image conversion apparatus, comprising:
executing, based on a first value used to obtain a first coordinate value in an area, which corresponds to a coordinate value of one pixel in a converted image, first calculation of obtaining a second value used to obtain a second coordinate value in the area, which corresponds to a coordinate value of a pixel adjacent to the one pixel in the converted image;
executing second calculation of obtaining the second coordinate value using the second value obtained by the first calculation;
executing coordinate conversion of converting the second coordinate value obtained by the second calculation into a third coordinate value in an image to be converted into the area; and
executing image conversion of converting the image into the converted image, based on the third coordinate value converted by the coordinate conversion,
wherein, in the first calculation, one of addition and subtraction is iteratively executed using a result of the first calculation and a predetermined constant so as to sequentially output a value corresponding to a multiplication result obtained by multiplying a coordinate value of each of a plurality of adjacent pixels in the converted image by the predetermined constant.

27. The method according to claim 26, wherein, in the coordinate conversion, the second coordinate value is nonlinearly transformed into the third coordinate value.

28. The method according to claim 26, wherein, in the coordinate conversion, the second coordinate value is converted into the third coordinate value to correct a lens distortion.

29. The method according to claim 26, wherein, in the second calculation, the second coordinate value in the area, which corresponds to the coordinate value of the adjacent pixel in the converted image, is obtained to convert four vertices in the image into four vertices in the converted image.

* * * * *